(12) United States Patent
Dang et al.

(10) Patent No.: US 12,298,479 B2
(45) Date of Patent: May 13, 2025

(54) OPTICAL IMAGING SYSTEM, IMAGE CAPTURING MODULE, AND ELECTRONIC DEVICE

(71) Applicant: JIANGXI JINGCHAO OPTICAL CO., LTD., Nanchang (CN)

(72) Inventors: Xuwen Dang, Nanchang (CN); Ming Li, Nanchang (CN); Binbin Liu, Nanchang (CN); Hairong Zou, Nanchang (CN)

(73) Assignee: JIANGXI JINGCHAO OPTICAL CO., LTD., Nanchang (CN)

( * ) Notice: Subject to any disclaimer, the term of this patent is extended or adjusted under 35 U.S.C. 154(b) by 713 days.

(21) Appl. No.: 17/614,499

(22) PCT Filed: Apr. 30, 2020

(86) PCT No.: PCT/CN2020/088515
§ 371 (c)(1),
(2) Date: Nov. 26, 2021

(87) PCT Pub. No.: WO2021/217664
PCT Pub. Date: Nov. 4, 2021

(65) Prior Publication Data
US 2022/0236536 A1    Jul. 28, 2022

(51) Int. Cl.
*G02B 9/62* (2006.01)
*G02B 13/00* (2006.01)

(52) U.S. Cl.
CPC .......... *G02B 13/0045* (2013.01); *G02B 9/62* (2013.01)

(58) Field of Classification Search
CPC ...... G02B 13/0045; G02B 9/62; G02B 13/04; G02B 13/06; G02B 13/18
See application file for complete search history.

(56) References Cited

U.S. PATENT DOCUMENTS

| 4,981,344 A | 1/1991 | Ueda |
| 6,414,800 B1 | 7/2002 | Hamano |

(Continued)

FOREIGN PATENT DOCUMENTS

| CN | 1206842 A | 2/1999 |
| CN | 1297164 A | 5/2001 |

(Continued)

OTHER PUBLICATIONS

International Search Report on International Patent Application PCT/CN2019/122072, filed Nov. 29, 2019, in the name of Jiangxi Jingchao Optical Co. Ltd.

(Continued)

*Primary Examiner* — Mustak Choudhury
(74) *Attorney, Agent, or Firm* — Franklin & Associates International Inc; Matthew F. Lambrinos

(57) ABSTRACT

The present disclosure provides an optical imaging system, an image capturing module, and an electronic device. The optical imaging system includes, sequentially from an object side to an image side, a first lens having negative refractive power, a second lens having refractive power, a third lens having positive refractive power, a fourth lens having refractive power, a fifth lens having negative refractive power, and a sixth lens having positive refractive power. The optical imaging system satisfies the following condition: 87.0°/mm<FOV/f≤128.0°/mm; where FOV is a maximum field of view of the optical imaging system and f is an effective focal length of the optical imaging system.

14 Claims, 15 Drawing Sheets

(56) References Cited

U.S. PATENT DOCUMENTS

| | | | |
|---|---|---|---|
| 6,985,309 | B2 | 1/2006 | Shinohara |
| 9,057,868 | B1 | 6/2015 | Chung et al. |
| 11,243,382 | B2 * | 2/2022 | Huang ............... G02B 13/0045 |
| 2004/0218285 | A1 | 11/2004 | Amanai |
| 2004/0264003 | A1 | 12/2004 | Noda |
| 2005/0046970 | A1 | 3/2005 | Amanai |
| 2008/0106801 | A1 | 5/2008 | Kang et al. |
| 2010/0254029 | A1 | 10/2010 | Shinohara |
| 2012/0075718 | A1 | 3/2012 | Seo |
| 2014/0063620 | A1 | 3/2014 | Jung et al. |
| 2015/0138425 | A1 | 5/2015 | Lee et al. |
| 2016/0124192 | A1 | 5/2016 | Koreeda |
| 2016/0161709 | A1 | 6/2016 | Hsueh et al. |
| 2016/0252709 | A1 * | 9/2016 | Lin ........................ G02B 9/62 348/335 |
| 2017/0176722 | A1 * | 6/2017 | Lin .................. G02B 13/0045 |
| 2017/0307858 | A1 | 10/2017 | Chen |
| 2018/0113282 | A1 | 4/2018 | Tsai |
| 2018/0180857 | A1 * | 6/2018 | Huang ..................... G02B 9/62 |
| 2018/0231744 | A1 * | 8/2018 | Lin ........................ G02B 13/06 |
| 2020/0073092 | A1 | 3/2020 | Chen |
| 2022/0236536 | A1 | 7/2022 | Dang et al. |

FOREIGN PATENT DOCUMENTS

| | | | | |
|---|---|---|---|---|
| CN | 101093274 | A | | 12/2007 |
| CN | 101983348 | A | | 3/2011 |
| CN | 102132189 | A | | 7/2011 |
| CN | 102419470 | A | | 4/2012 |
| CN | 102466864 | A | | 5/2012 |
| CN | 202522758 | U | | 11/2012 |
| CN | 102914851 | A | | 2/2013 |
| CN | 102985865 | A | | 3/2013 |
| CN | 102998774 | A | | 3/2013 |
| CN | 103676088 | A | | 3/2014 |
| CN | 103852858 | A | | 6/2014 |
| CN | 103969804 | A | | 8/2014 |
| CN | 104570277 | A | | 4/2015 |
| CN | 104570295 | A | | 4/2015 |
| CN | 104914558 | A | | 9/2015 |
| CN | 104932086 | A | | 9/2015 |
| CN | 204631345 | U | | 9/2015 |
| CN | 105259636 | A | | 1/2016 |
| CN | 105372793 | A | | 3/2016 |
| CN | 105607232 | A | | 5/2016 |
| CN | 105607233 | A | | 5/2016 |
| CN | 205210492 | U | | 5/2016 |
| CN | 205210493 | U | | 5/2016 |
| CN | 105988185 | A | | 10/2016 |
| CN | 105988186 | A | | 10/2016 |
| CN | 106033141 | A | | 10/2016 |
| CN | 106154496 | A | | 11/2016 |
| CN | 106338815 | A | | 1/2017 |
| CN | 106526796 | A | | 3/2017 |
| CN | 206074890 | U | | 4/2017 |
| CN | 106610518 | A | | 5/2017 |
| CN | 106646825 | A | | 5/2017 |
| CN | 106772931 | A | | 5/2017 |
| CN | 106773008 | A | | 5/2017 |
| CN | 106802469 | A | | 6/2017 |
| CN | 106842512 | A | | 6/2017 |
| CN | 106842514 | A | | 6/2017 |
| CN | 106896474 | A | | 6/2017 |
| CN | 106959500 | A | | 7/2017 |
| CN | 106970464 | A | | 7/2017 |
| CN | 107024756 | A | | 8/2017 |
| CN | 107102425 | A | | 8/2017 |
| CN | 107167897 | A | | 9/2017 |
| CN | 107167902 | A | | 9/2017 |
| CN | 206460205 | U | | 9/2017 |
| CN | 107290843 | A | | 10/2017 |
| CN | 206946078 | U | | 1/2018 |
| CN | 107703609 | A | | 2/2018 |
| CN | 107831588 | A | | 3/2018 |
| CN | 207164341 | U | | 3/2018 |
| CN | 107976770 | A | | 5/2018 |
| CN | 108089278 | A | | 5/2018 |
| CN | 108089317 | A | | 5/2018 |
| CN | 207424362 | U | | 5/2018 |
| CN | 207424363 | U | | 5/2018 |
| CN | 108107548 | A | | 6/2018 |
| CN | 108227146 | A | | 6/2018 |
| CN | 207557562 | U | | 6/2018 |
| CN | 108459394 | A | | 8/2018 |
| CN | 108761745 | A | | 11/2018 |
| CN | 108873250 | A | | 11/2018 |
| CN | 109283665 | A | | 1/2019 |
| CN | 109375346 | A | | 2/2019 |
| CN | 208506348 | U | | 2/2019 |
| CN | 109407267 | A | | 3/2019 |
| CN | 109725406 | A | | 5/2019 |
| CN | 109752823 | A | | 5/2019 |
| CN | 109814234 | A | | 5/2019 |
| CN | 109814235 | A | | 5/2019 |
| CN | 208833988 | U | | 5/2019 |
| CN | 208872939 | U | | 5/2019 |
| CN | 208888449 | U | | 5/2019 |
| CN | 109870786 | A | | 6/2019 |
| CN | 109870788 | A | | 6/2019 |
| CN | 109917533 | A | | 6/2019 |
| CN | 110018556 | A | | 7/2019 |
| CN | 209070186 | U | | 7/2019 |
| CN | 110109226 | A | | 8/2019 |
| CN | 110208927 | A | | 9/2019 |
| CN | 110261997 | A | | 9/2019 |
| CN | 110398815 | A | | 11/2019 |
| CN | 110426822 | A | | 11/2019 |
| CN | 110531500 | A | | 12/2019 |
| CN | 110568583 | A | | 12/2019 |
| CN | 110618522 | A | | 12/2019 |
| CN | 209765129 | U | | 12/2019 |
| CN | 110646919 | A | | 1/2020 |
| CN | 110646921 | A | | 1/2020 |
| CN | 110794555 | A | | 2/2020 |
| CN | 110879454 | A | | 3/2020 |
| CN | 111007649 | A | | 4/2020 |
| CN | 111025600 | A | | 4/2020 |
| CN | 111308688 | A | | 6/2020 |
| CN | 111338057 | A | | 6/2020 |
| CN | 210720853 | U | | 6/2020 |
| CN | 111399186 | A | | 7/2020 |
| CN | 211786331 | U | | 10/2020 |
| CN | 111965789 | A * | 11/2020 | ......... G02B 13/0045 |
| DE | 69833908 | T2 | | 10/2006 |
| JP | 2008268977 | A | | 11/2008 |
| JP | 4751732 | B2 | | 8/2011 |
| JP | 2013235242 | A | | 11/2013 |
| KR | 1020140135909 | A | | 11/2014 |
| TW | 200821628 | A | | 5/2008 |
| TW | 201350956 | A | | 12/2013 |
| TW | I625567 | B | | 6/2018 |
| TW | I640811 | B | | 11/2018 |
| TW | I655474 | B | | 4/2019 |
| WO | 2003046633 | A2 | | 6/2003 |
| WO | 2014162779 | A1 | | 10/2014 |
| WO | 2015159721 | A1 | | 10/2015 |
| WO | 2017180362 | A1 | | 10/2017 |
| WO | 2020073978 | A1 | | 4/2020 |
| WO | 2020220444 | A1 | | 11/2020 |
| WO | 2020258269 | A1 | | 12/2020 |
| WO | 2021026869 | A1 | | 2/2021 |
| WO | 2021072745 | A1 | | 4/2021 |
| WO | 2021087661 | A1 | | 5/2021 |
| WO | 2021087669 | A1 | | 5/2021 |
| WO | 2021102943 | A1 | | 6/2021 |
| WO | 2021103797 | A1 | | 6/2021 |
| WO | 2021109127 | A1 | | 6/2021 |
| WO | 2021138754 | A1 | | 7/2021 |
| WO | 2021179207 | A1 | | 9/2021 |
| WO | 2021184164 | A1 | | 9/2021 |
| WO | 2021184165 | A1 | | 9/2021 |
| WO | 2021184167 | A1 | | 9/2021 |

(56) References Cited

FOREIGN PATENT DOCUMENTS

| WO | 2021203277 | A1 | 10/2021 |
| WO | 2021217504 | A1 | 11/2021 |
| WO | 2021217664 | A1 | 11/2021 |

OTHER PUBLICATIONS

U.S. Appl. No. 17/606,027, 371 filed Oct. 23, 2021, in the name of Jiangxi Jingchao Optical Co. Ltd.
International Search Report on International Patent Application PCT/CN2019/111957, filed Oct. 18, 2019, in the name of Jiangxi Jingchao Optical Co. Ltd.
U.S. Appl. No. 17/606,040, 371 filed Oct. 24, 2021, in the name of Jiangxi Jingchao Optical Co. Ltd.
International Search Report dated Nov. 4, 2019 on International Patent Application PCT/CN2019/115318 filed Jul. 1, 2020, in the name of Jiangxi Jingchao Optical Co. Ltd.
U.S. Appl. No. 17/606,359, 371 filed Oct. 25, 2021, in the name of Jiangxi Jingchao Optical Co. Ltd.
International Search Report on International Patent Application PCT/CN2020/079517, filed Mar. 16, 2020, in the name of Jiangxi Jingchao Optical Co. Ltd.
U.S. Appl. No. 17/609,381, 371 filed Nov. 6, 2021, in the name of Jiangxi Jingchao Optical Co. Ltd.
International Search Report dated Jul. 16, 2020 on International Patent Application PCT/CN2019/123679 filed Aug. 25, 2020, in the name of Jiangxi Jingchao Optical Co. Ltd.
U.S. Appl. No. 17/610,693, 371 filed Nov. 11, 2021, in the name of Jiangxi Jingchao Optical Co. Ltd.
International Search Report on International Patent Application PCT/CN2020/070404, filed Jan. 6, 2020, in the name of Jiangxi Jingchao Optical Co. Ltd.
U.S. Appl. No. 17/440,691, 371 filed Sep. 17, 2021, in the name of Jiangxi Jingchao Optical Co. Ltd.
International Search Report dated Dec. 16, 2020 on International Patent Application PCT/CN2020/079515 filed Dec. 23, 2020, in the name of Jiangxi Jingchao Optical Co. Ltd.
U.S. Appl. No. 17/611,148, 371 filed Nov. 13, 2021, in the name of Jiangxi Jingchao Optical Co. Ltd.
International Search Report dated on Jan. 15, 2020 on International Patent Application PCT/CN2019/110525, filed Jan. 3, 2020, in the name of Jiangxi Jingchao Optical Co. Ltd.
U.S. Appl. No. 17/284,467, 371 filed Apr. 11, 2021, in the name of Jiangxi Jingchao Optical Co. Ltd.
International Search Report on International Patent Application PCT/CN2019/100747, filed Aug. 8, 2019, in the name of Jiangxi Jingchao Optical Co. Ltd.
U.S. Appl. No. 17/601,075, 371 filed Oct. 3, 2021, in the name of Jiangxi Jingchao Optical Co. Ltd.
International Search Report dated Mar. 27, 2019 on International Patent Application PCT/CN2020/072135, filed Jan. 15, 2020, in the name of Jiangxi Jingchao Optical Co. Ltd.
U.S. Appl. No. 17/440,786, 371 filed Sep. 19, 2021, in the name of Jiangxi Jingchao Optical Co. Ltd.
U.S. Appl. No. 17/605,985, 371 filed Oct. 22, 2021, in the name of OFilm Group Co. Ltd. and Jiangxi Jingchao Optical Co. Ltd.
International Search Report on International Patent Application PCT/CN2019/115349, filed Dec. 4, 2019, in the name of Jiangxi Jingchao Optical Co. Ltd.
U.S. Appl. No. 17/606,005, 371 Oct. 22, 2021, in the name of Jiangxi Jingchao Optical Co. Ltd.
International Search Report on International Patent Application PCT/CN2019/093780, filed Jun. 28, 2019, in the name of Jiangxi Jingchao Optical Co. Ltd.
U.S. Appl. No. 17/605,537, 371 filed Oct. 21, 2021, in the name of Jiangxi Jingchao Optical Co. Ltd.
International Search Report dated Apr. 30, 2019 on International Patent Application PCT/CN2019/091801 filed Jun. 19, 2019, in the name of Jiangxi Jingchao Optical Co. Ltd.
U.S. Appl. No. 17/604,739, 371 filed Oct. 18, 2021, in the name of Jiangxi Jingchao Optical Co. Ltd.
International Search Report on International Patent Application PCT/CN2020/087819, filed Apr. 29, 2020, in the name of Jiangxi Jingchao Optical Co. Ltd.
U.S. Appl. No. 17/611,162, 371 filed Nov. 14, 2021, in the name of Jiangxi Jingchao Optical Co. Ltd.
International Search Report on International Patent Application PCT/CN2020/103797, filed Jul. 23, 2020, in the name of Ofilm Group Co. Ltd.
U.S. Appl. No. 17/612,556, 371 filed Nov. 18, 2021, in the name of Jiangxi Jingchao Optical Co. Ltd.
International Search Report on International Patent Application PCT/CN2020/079526, filed Mar. 16, 2020, in the name of Jiangxi Jingchao Optical Co. Ltd.
U.S. Appl. No. 17/611,165, 371 filed Nov. 14, 2021, in the name of Jiangxi Jingchao Optical Co. Ltd.
International Search Report dated Nov. 3, 2020 on International Patent Application PCT/CN2020/078814 filed Nov. 26, 2020, in the name of Jiangxi Jingchao Optical Co. Ltd.
U.S. Appl. No. 17/611,569, 371 filed Nov. 16, 2021, in the name of Jiangxi Jingchao Optical Co. Ltd.
International Search Report on International Patent Application PCT/CN2020/083697, filed Apr. 8, 2020, in the name of Jiangxi Jingchao Optical Co. Ltd.
U.S. Appl. No. 17/614,359, 371 filed Nov. 25, 2021, in the name of Jiangxi Jingchao Optical Co. Ltd.
U.S. Appl. No. 17/536,006, filed Nov. 27, 2021, in the name of Jiangxi Jingchao Optical Co. Ltd.
U.S. Appl. No. 17/536,010, filed Nov. 27, 2021, in the name of Jiangxi Jingchao Optical Co. Ltd.
Indian Office Action issued Oct. 20, 2022, on an Indian Application No. 202117054846, filed Nov. 26, 2021. English abstract attached.
International Search Report issued Nov. 26, 2021, on a PCT No. PCT/CN2020/088515, filed Apr. 30, 2020.
Written Opinion issued Nov. 26, 2021, on a PCT No. PCT/CN2020/088515, filed Apr. 30, 2020.

* cited by examiner

OPTICAL IMAGING SYSTEM, IMAGE CAPTURING MODULE, AND ELECTRONIC DEVICE

CROSS-REFERENCE OF RELATED APPLICATION

This application is a national stage, filed under 35 U.S.C. § 371, of International Application No. PCT/CN2020/088515, filed on Apr. 30, 2020, and entitled "OPTICAL IMAGING SYSTEM, IMAGE CAPTURING MODULE, AND ELECTRONIC DEVICE", the content of which is incorporated herein in entirety by reference.

TECHNICAL FIELD

The present disclosure relates to optical imaging technology, in particular to an optical imaging system, an image capturing module, and an electronic device.

BACKGROUND

At present, wide-angle optical camera lenses have been widely used in smart phones and smart electronic devices. The problem of obvious distortion of the edge field of view of the wide-angle lens has attracted the attention of consumers and terminal manufacturers. In the process of implementing the present disclosure, the inventors found that there are at least the following problems in the prior art: the larger the field of view of the optical camera lens, the more obvious the edge distortion, which affects the imaging quality. How to make the optical camera lens have both wide viewing angle and good imaging quality is an urgent problem to be solved by those skilled in the art.

SUMMARY

Accordingly, it is necessary to propose an optical imaging system, an image capturing module, and an electronic device to solve the aforementioned problems.

The embodiments of the present disclosure provides an optical imaging system, which includes, sequentially from an object side to an image side:
a first lens having negative refractive power;
a second lens having refractive power;
a third lens having positive refractive power;
a fourth lens having refractive power;
a fifth lens having negative refractive power; and
a sixth lens having positive refractive power;
the optical imaging system satisfies the following condition:

$$87.0°/mm < FOV/f \leq 128.0°/mm;$$

where FOV is a maximum field of view of the optical imaging system and f is an effective focal length of the optical imaging system.

By the aforementioned reasonable configuration of refractive powers, the optical imaging system can provide a field of view of more than 120° by satisfying the aforementioned condition, so as to effectively increase a viewfinding area of a picture. Further, the field of view can reach 134.4°, the effective focal length is reduced, and the system has a certain macro capability while accommodating more image capturing area. The optical imaging system of the embodiment of the present disclosure can improve the ability of the optical imaging system to capture low-frequency details, reduce distortion of the edge field of view effectively, increase the f-number, and realize both the wide viewing angle and higher imaging quality.

In some of the embodiments, an object side surface of the first lens is concave at an optical axis, and an image side surface thereof is concave at the optical axis;
an object side surface of the second lens is convex at the optical axis, and an image side surface thereof is concave at the optical axis;
an object side surface of the third lens is convex at the optical axis, and an image side surface thereof is convex at the optical axis;
an object side surface of the fourth lens is concave at the optical axis, and an image side surface thereof is convex at the optical axis;
an object side surface of the fifth lens is concave at a circumference, an image side surface thereof is concave at the circumference, and both the object side surface and the image side surface thereof are aspherical;
an object side surface of the sixth lens is convex at the optical axis, an image side surface thereof is concave at the optical axis, both the object side surface and the image side surface thereof are aspherical, and at least one of the object side surface and the image side surface thereof is provided with at least one inflection point.

The optical imaging system of the embodiment of the present disclosure has a wide working range through a reasonable lens configuration, reduces the size of the optical imaging system while maintaining good optical performance, and realizes miniaturization of the optical imaging system.

In some embodiments, the optical imaging system further includes a stop disposed between the second lens and the third lens.

The stop is used to reduce stray light and help to improve image quality, and since the stop is arranged between the second lens and the third lens, it is possible to realize a large field of view, so that the structure of the optical imaging system is symmetrical and the optical distortion is better controlled.

In some embodiments, the optical imaging system satisfies the following condition:

$$4.5 < SD1/CT12 < 16.5;$$

where SD1 is a vertical distance from an edge of an optical effective region of an object side surface of the first lens to an optical axis, and CT12 is a distance between an image side surface of the first lens and an object side surface of the second lens at the optical axis.

By satisfying the aforementioned condition, SD1 is effectively compressed, so that the size of the head of the optical imaging system can be reduced, and the width of the optical imaging system in a direction perpendicular to the optical axis is reduced, which is matched with the reduction of CT12 to compress the overall volume to a greater extent, improve the compactness, realize miniaturization, and reduce the risk of ghost images. In addition, the arrangement difficulty of the structure is reduced and the assembly and molding yield is improved.

In some embodiments, the optical imaging system satisfies the following condition:

$$2.0\% < |DIS/FNO| < 8.0\%;$$

where DIS is a maximum value of an optical distortion of the optical imaging system, and FNO is an f-number of the optical imaging system.

By satisfying the aforementioned condition, the f-number FNO can be increased and a field of view of more than 120° can be obtained. In this case, the overall structure of the optical imaging system should be reasonably controlled to make the optical distortion smaller, thereby reducing the distortion situation of the edge of wide-angle shooting, and obtaining better image quality.

In some embodiments, the optical imaging system satisfies the following condition:

$$CT45/ET5<0.30;$$

where CT45 is a distance between an image side surface of the fourth lens and an object side surface of the fifth lens at an optical axis, and ET5 is a thickness of an edge of an optical effective region of the fifth lens.

By satisfying the aforementioned condition, the fourth lens and the fifth lens form a certain matching shape, the fifth lens has negative refractive power, the fourth lens has refractive power, the fourth lens and the fifth lens are matched, which has a very good correction effect on chromatic aberration, in addition, it also has a better correction effect on the spherical aberration, which can improve the resolution of the optical imaging system. In addition, the reduction in size facilitates the compactness of the system and the compression of the optical length.

In some embodiments, the optical imaging system satisfies the following condition:

$$0.2<SAG62/R61<0.5;$$

where SAG62 is a maximum sagittal height of an image side surface of the sixth lens, and R61 is a curvature radius of an object side surface of the sixth lens at an optical axis.

By satisfying the aforementioned condition, the wavy lens structure of the sixth lens provides a good refractive power distribution in the direction perpendicular to the optical axis, provides a good transition for light of edge field of view to incident on the image plane, reduces the incident angle of the image plane, and is conductive to improving the relative brightness on the image plane and reducing the tolerance sensitivity of the lens.

In some embodiments, the optical imaging system satisfies the following condition:

$$20.0<|R41/ET4|<71.5;$$

where R41 is a curvature radius of an object side surface of the fourth lens at an optical axis, and ET4 is a thickness of an edge of an optical effective region of the fourth lens.

By satisfying the aforementioned condition, the surface shape and thickness of the fourth lens change, such that the light contracted by the first lens and the second lens gradually diffuses at the fourth lens, avoiding the increase of sensitivity caused by excessive light deflection.

In some embodiments, the optical imaging system satisfies the following condition:

$$0.35<(CT1+CT2)/SD1<0.5;$$

where CT1 is a thickness of the first lens at an optical axis, CT2 is a thickness of the second lens at the optical axis, and SD1 is a vertical distance from an edge of an effective region of an object side surface of the first lens to the optical axis.

By satisfying the aforementioned condition, the reduction of CT1 and CT2 can reduce SD1, thereby reducing the size of the head of the optical imaging system, reducing the optical length of the optical imaging system, and making it easier to mold and manufacture.

In some embodiments, the optical imaging system satisfies the following condition:

$$1.2\leq(CT3+CT4+CT5)/BF<2.4;$$

where CT3 is a thickness of the third lens at an optical axis, CT4 is a thickness of the fourth lens at the optical axis, CT5 is a thickness of the fifth lens at the optical axis, and BF is a minimum distance between an image side surface of the sixth lens and an image plane in a direction parallel to the optical axis.

By satisfying the aforementioned condition, it can be ensured that the optical imaging system and the photosensitive chip have enough matching space, which is conductive to improving the assembly yield. In addition, the reasonable configuration of CT3, CT4, and CT5 can reduce the optical length, is beneficial to forming symmetry of the structure, and reduces optical distortion.

In some embodiments, the optical imaging system satisfies the following condition:

$$0.85<TTL/(ImgH*2)<1.1$$

where TTL is a distance from an object side surface to an imaging plane of the first lens at an optical axis, and ImgH is half of a diagonal length of an effective imaging region of the optical imaging system on the imaging plane.

By satisfying the aforementioned condition, the total optical length can be compressed, making the structure of the optical imaging system more compact, while maintaining a reasonable distribution of thickness of the lens, which is helpful for molding and assembly. ImgH can be increased properly to obtain support for chips with a large image plane size.

The embodiment of the present disclosure provides an image capturing module, which includes the optical imaging system described in any of the embodiments; and a photosensitive element arranged on the image side of the optical imaging system.

The image capturing module of the embodiments of the present disclosure includes an optical imaging system. The optical imaging system can improve the ability of the optical imaging system to capture low-frequency details, effectively reduce distortion of the edge field of view, increase the f-number, and realize both the wide viewing angle and higher imaging quality via reasonable configuration of refractive powers.

The embodiment of the present disclosure provides an electronic device, including: a housing and the image capturing module of the aforementioned embodiment, and the image capturing module is mounted on the housing.

The electronic device of the embodiment of the present disclosure includes an image capturing module. The ability of the optical imaging system to capture low-frequency details can be improved, the distortion of the edge viewing field can be effectively reduced, the f-number can be increased, and wide viewing angle and higher imaging quality can be realized via configuration of refractive powers.

BRIEF DESCRIPTION OF THE DRAWINGS

The aforementioned and/or additional aspects and advantages of the present disclosure can be made apparent and easy to understand from the description of the embodiments in conjunction with the following drawings, in which.

SYMBOL DESCRIPTION OF MAIN COMPONENTS

Figure 1:
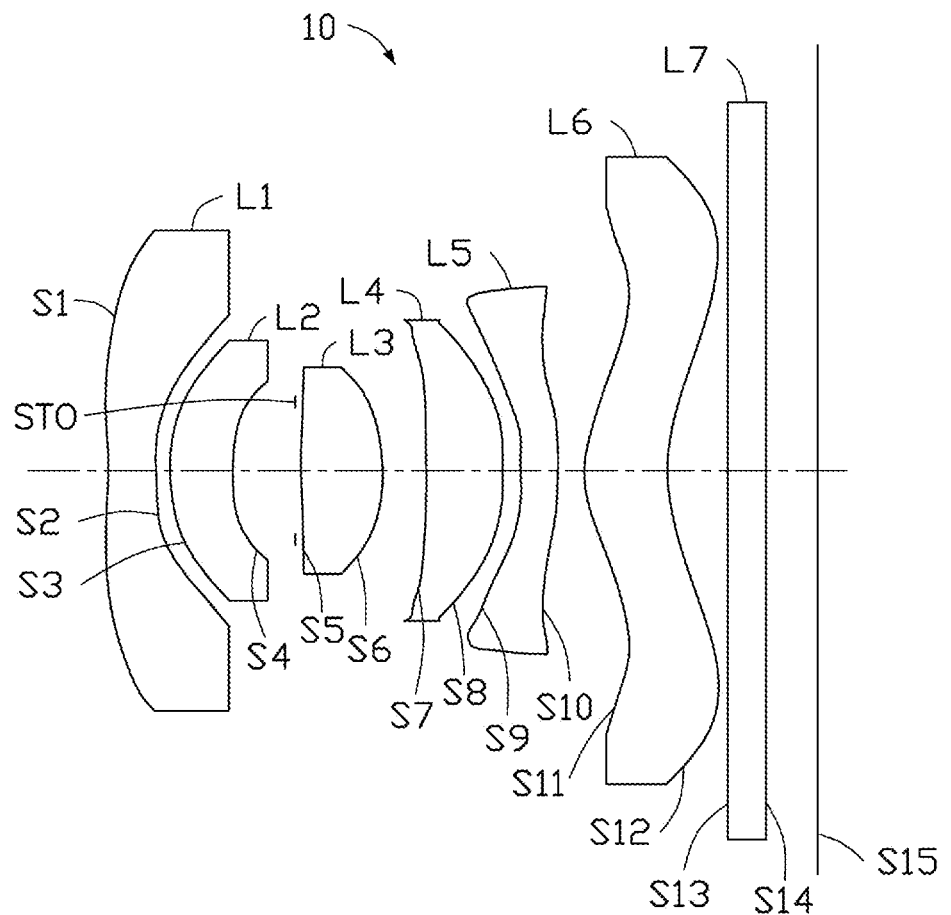
FIG. 1 is a schematic view of an optical imaging system according to a first embodiment of the present disclosure.

| | |
|---|---|
| electronic device | 1000 |
| image capturing module | 100 |
| optical imaging system | 10 |
| first lens | L1 |
| second lens | L2 |
| third lens | L3 |
| fourth lens | L4 |
| fifth lens | L5 |
| sixth lens | L6 |
| infrared filter | L7 |
| stop | STO |
| object side surfaces | S1, S3, S5, S7, S9, S11, S13 |
| image side surfaces | S2, S4, S6, S8, S10, S12, S14 |
| image plane | S15 |
| photosensitive element | 20 |
| housing | 200 |

DETAILED DESCRIPTION OF THE EMBODIMENTS

In order to make the objectives, technical solutions and advantages of the present disclosure more clear, the present disclosure will be further described in detail below in conjunction with the drawings and specific embodiments. It should be understood that the specific embodiments described here are only used to explain the present disclosure, and are not used to limit the present disclosure. All other embodiments obtained by a person of ordinary skill in the art based on the embodiments in the present disclosure without creative efforts are within the scope of the present disclosure.

In the description of the present disclosure, it should be understood that the azimuth or positional relationship indicated by the terms "center," "longitudinal," "transverse," "length," "width," "thickness," "upper," "lower," "front," "rear," "left," "right," "vertical," "horizontal," "top," "bottom," "inner," "outer," "clockwise," "counterclockwise," and the like are based on the azimuth or positional relationship shown in the accompanying drawings, only for the purpose of facilitating the description of the present disclosure and simplifying the description, and not that the device or element indicated or implied must have a particular azimuth, be constructed and operated in a particular azimuth, and therefore cannot be understood as a limitation on the present disclosure. In addition, the terms "first" and "second" are only used for description purposes, and cannot be understood as indicating or implying relative importance or implicitly indicating the number of the indicated technical features. Therefore, the features defined with "first" and "second" may explicitly or implicitly include one or a plurality of the features. In the description of the present disclosure, "plurality" means at least two, such as two or more than two, unless otherwise specifically defined.

In the description of the present disclosure, it should be noted that, unless otherwise clearly specified and limited, the terms "installation", "connection with each together", and "connection" should be understood in a broad sense, for example, it can be a fixed connection or a detachable connection, or an integral connection; it can be a mechanical connection, or it can be an electrical connection or a communication with each other; it can be a direct connection, or an indirectly connection via an intermediate medium, it can be an internal communication of two components or the interaction of two components relation. For those who skill in the art, the specific meaning of the aforementioned terms in the present disclosure can be understood according to specific situations.

In the present disclosure, unless expressly stipulated and defined otherwise, a first feature is "above" or "below" of a second feature may include direct contact between the first and second features, or may include contact between the first and second features via other characteristics between them instead of direct contact. Moreover, the first feature is "above", "on" and "over" the second feature include that the first feature is directly above and obliquely above the second feature, or it simply means that the level height of the first feature is higher than the second feature. The first feature is "below", "under" and "underneath" the second feature include that the first feature is directly below and obliquely below the second feature, or it simply means that the level height of the first feature is smaller than the second feature.

The following disclosure provides many different embodiments or examples for realizing different structures of the present disclosure. In order to simplify the disclosure of the present disclosure, the components and settings of specific examples are described below. Of course, they are only examples, and are not intended to limit the present disclosure. In addition, the present disclosure may repeat reference numerals and/or reference letters in different examples. Such repetition is for the purpose of simplification and clarity, and does not indicate the relationship between the various embodiments and/or settings discussed. In addition, the present disclosure provides examples of various specific processes and materials, but those of ordinary skill in the art may be aware of the application of other processes and/or the use of other materials.

Referring to FIG. 1, an optical imaging system 10 according to an embodiment of the present disclosure includes, sequentially from an object side to an image side, a first lens L1 having negative refractive power, a second lens L2 having refractive power, a third lens L3 having positive refractive power, a fourth lens L4 having refractive power, a fifth lens L5 having negative refractive power, and a sixth lens L6 having positive refractive power.

The first lens L1 has an object side surface S1 and an image side surface S2. The second lens L2 has an object side surface S3 and an image side surface S4. The third lens L3 has an object side surface S5 and an image side surface S6. The fourth lens L4 has an object side surface S7 and an image side surface S8, and the object side surface S7 is concave at an optical axis. The fifth lens L5 has an object side surface S9 and an image side surface S10. The sixth lens L6 has an object side surface S11 and an image side surface S12. The optical imaging system 10 satisfies the following relation:

$$87.0°/mm < FOV/f \leq 128.0°/mm;$$

where FOV is a maximum field of view of the optical imaging system 10, and f is an effective focal length of the optical imaging system 10. That is, FOV/f may be any value in a range of (87°/mm, 128°/mm], for example, the value may be 124.07°/mm, 91.68°/mm, 117.94°/mm, 87.86°/mm, 106.56°/mm, 120.55°/mm, 128°/mm, etc.

By the aforementioned reasonable configuration of refractive powers, the optical imaging system 10 of the embodiment of the present disclosure fulfills the wide-angle requirement of the optical imaging system 10, improves an ability of the optical imaging system 10 to capture low-frequency details, reduces the distortion of the edge field of view effectively, increases the f-number, and can ensure that the optical imaging system 10 has a better imaging quality.

By satisfying the aforementioned condition, the optical imaging system 10 can provide the field of view of more than 120°, so as to increase a viewfinding area of a picture effectively. Furthermore, the field of view can reach 134.4°, the effective focal length is reduced, and the system has a certain macro capability while accommodating more image capturing area. For example, the focusing object distance can reach 50 mm. The ability of the system to capture low-frequency details can be improved by reasonable configuration of refractive powers, so as to meet the design requirements of high image quality.

In some embodiments, the object side surface S1 of the first lens L1 is concave at the optical axis, and the image side surface S2 thereof is concave at the optical axis; the object side surface S3 of the second lens L2 is convex at the optical axis, and the image side surface S4 thereof is concave at the optical axis; the object side surface S5 of the third lens L3 is convex at the optical axis, and the image side surface S6 thereof is convex at the optical axis; the image side surface S8 of the fourth lens L4 is convex at the optical axis; the object side surface S9 of the fifth lens L5 is concave at the circumference, and the image side surface S10 thereof is concave at the circumference, both the object side surface S9 and the image side surface S10 are aspherical; the object side surface S11 of the sixth lens L6 is convex at the optical axis, and the image side surface S12 thereof is concave at the optical axis, both the object side surface S11 and the image side surface S12 are aspherical. At least one of the object side surface S11 and the image side surface S12 is provided with at least one inflection point.

The optical imaging system 10 has a wide working range through a reasonable lens configuration, reduces the size of the optical imaging system 10 while maintaining good optical performance, and realizes miniaturization of the optical imaging system 10.

In some embodiments, the optical imaging system 10 further includes a stop STO. The stop STO can be arranged in front of the first lens L1, behind the sixth lens L6, between any two lenses, or on a surface of any one lens. The stop STO is used to reduce stray light and help to improve image quality.

Preferably, the stop STO is a central stop. For example, in FIG. 1, the stop STO is arranged between the second lens L2 and the third lens L3, thereby making it possible to realize a large field of view. In addition, the central stop makes the structure of the optical imaging system 10 in certain symmetry, which allows the optical distortion to be better controlled.

In some embodiments, the optical imaging system 10 further includes an infrared filter L7, and the infrared filter L7 has an object side surface S13 and an image side surface S14. The infrared filter L7 is arranged on the image side surface S12 of the sixth lens L6 to filter out light in other wavelength bands such as visible light, and only allow infrared light to pass through, so that the optical imaging system 10 can be used for imaging in dim environment and other special application scenarios.

When the optical imaging system 10 is used for imaging, light emitted or reflected by a subject enters the optical imaging system 10 from an direction of the object side, and sequentially passes through the first lens L1, the second lens L2, the third lens L3, the fourth lens L4, the fifth lens L5, and the sixth lens L6, and finally converges on an image plane S15.

In some embodiments, the first lens L1, the second lens L2, the third lens L3, the fourth lens L4, the fifth lens L5, and the sixth lens L6 are made of plastic materials.

In some embodiments, the first lens L1, the second lens L2, the third lens L3, the fourth lens L4, the fifth lens L5, and the sixth lens L6 are aspherical lenses.

In some embodiments, the optical imaging system 10 satisfies the following condition:

$$4.5 < SD1/CT12 < 16.5;$$

where SD1 is a vertical distance from an edge of an optical effective region of an object side surface S1 of the first lens L1 to an optical axis, representing the size of the head of the optical imaging system 10, which affects the structure arrangement and assembly yield. CT12 is a distance between an image side surface S2 of the first lens L1 and an object side surface S3 of the second lens L2 at the optical axis. That is, SD1/CT12 may be any value in a range of (4.5, 16.5), for example, the value may be 16.38, 5.59, 6.28, 8.19, 4.80, 5.18, 8.67, etc.

By satisfying the aforementioned condition, SD1 is effectively compressed, so that the size of the head of the optical imaging system 10 can be reduced, and the width of the optical imaging system 10 in a direction perpendicular to the optical axis is reduced, which is matched with the reduction of CT12 to compress the overall volume to a greater extent, improve the compactness, realize miniaturization, and reduce the risk of ghost images. In addition, the arrangement difficulty of the structure is reduced, and the assembly and molding yield is improved. When CT12>0.3, on the premise of satisfying FOV requirements, due to the rapid reduction of the deflection angle incident on the second lens L2, it is difficult to control the central thickness of the first lens L1 and SD1 in a reasonable range. If SD1 is too large, the possibility of structure arrangement will be lost.

In some embodiments, the optical imaging system 10 satisfies the following condition:

$$2.0\% < |DIS/FNO| < 8.0\%;$$

where DIS is a maximum value of an optical distortion of the optical imaging system 10, and FNO is an f-number of the optical imaging system 10, that is, |DIS/FNO| may be any value in a range of (2.0%, 8.0%), for example, the value may be 6.83%, 3.64%, 7.89%, 7.05%, 5.89%, 2.12%, 6.98%, etc.

The arrangement of the central stop makes the structure of the optical imaging system 10 in a certain symmetry, which allows the optical distortion to be better controlled. FNO and the diffraction limit are positively correlated with the Airy spot. By satisfying the aforementioned condition, the system can obtain a large aperture effect while obtaining a field of view of more than 120°. In this case, the overall structure of the system should be reasonably controlled, such that the optical distortion is less than 15%, and the minimum DIS is up to 5%. Thus, the distortion situation at the edge of wide-angle shooting can be reduced. Moreover, FNO<1.9, the diffraction limit of the system is further improved, and a higher optical transfer function value and better image quality can be obtained by matching with a good lens surface shape and refractive power configuration. As a result, the distortion situation at the edge of wide-angle shooting can be reduced, and better image quality can be obtained.

In some embodiments, the optical imaging system 10 satisfies the following condition:

$$CT45/ET5 < 0.30;$$

where CT45 is a distance between an image side surface S8 of the fourth lens L4 and an object side surface S9 of the fifth lens L5 at an optical axis, and ET5 is a thickness of an edge of an optical effective region of the fifth lens L5, that is, CT45/ET5 may be any value less than 0.30, for example, the value may be 0.22, 0.08, 0.05, 0.27, 0.26, 0.19, 0.20, etc. When CT45>0.15, the fifth lens L5 can provide edge light with a proper deflection angle, and the surface shape of the image side surface S8 thereof will change complicatedly and introduce more aberrations. By satisfying the aforementioned condition, the fourth lens L4 and the fifth lens L5 form a certain matching shape, which can reduce the axial size, which facilitates the improvement of the compactness of the system and the reduction of the optical length. When CT45<0.11, the fourth lens L4 and the fifth lens L5 are matched in a C shape. The smaller the distance between the two lenses, the closer the two lenses are to a cemented lens. The fifth lens L5 has negative refractive power, and the fourth lens L4 has positive or negative refractive power. The matching of the fourth lens L4 and the fifth lens L5 with high and low refractive indexes has a very good correction effect on chromatic aberration and a good correction effect on spherical aberration. A good refractive power arrangement can make the system have a good resolution improvement.

In some embodiments, the optical imaging system 10 satisfies the following condition:

$$0.2 < SAG62/R61 < 0.5;$$

where SAG62 is a maximum sagittal height of an image side surface S12 of the sixth lens L6, and R61 is a curvature radius of an object side surface S11 of the sixth lens L6 at an optical axis, that is, SAG62/R61 may be any value in a range of (0.2, 0.5), for example, the value may be 0.44, 0.42, 0.30, 0.22, 0.32, 0.31, 0.46, etc. The "sagittal height" is a distance from a projection of the edge of the effective region of the image side surface of the lens on the optical axis to an intersection point of the image side surface of the lens and the optical axis.

By satisfying the aforementioned condition, the wavy lens structure of the sixth lens L6 provides a good refractive power distribution in the direction perpendicular to the optical axis, provides a good transition for light of edge field of view to incident on the image plane S15, reduces the incident angle of the image plane, and is conductive to improving the relative brightness on the image plane S15 and reducing the tolerance sensitivity of the lens.

In some embodiments, the optical imaging system 10 satisfies the following condition:

$$20.0 < |R41/ET4| < 71.5;$$

where R41 is a curvature radius of an object side surface S7 of the fourth lens L4 at an optical axis, and ET4 is a thickness of an edge of an optical effective region of the fourth lens L4, that is, |R41/ET4| may be any value in a range of (20.0, 71.5), for example, the value may be 27.33, 11.41, 20.56, 33.92, 28.43, 13.74, 71.20, etc.

By satisfying the aforementioned condition, the surface shape and thickness of the fourth lens L4 change, such that the light contracted by the first lens L1 and the second lens L2 gradually diffuses at the fourth lens L4, avoiding the increase of sensitivity caused by excessive light deflection. In some embodiments, ET4<0.27, which can make the fourth lens L4 have a shape of meniscus, the refractive power changes, the primary aberrations introduced by the object side surface are small, and the introduction of image side aberrations can be matched with other lenses to correct the overall aberration; reasonable configuration of the refractive powers can improve the image quality of the system. If ET4>0.3, the surface shape of the object side surface S7 of the fourth lens L4 tends to be flat, and the deflection ability of the edge light is reduced, which makes it difficult to improve the performance of the edge field of view. If ET<0.1, it is difficult to balance a ratio of the central thickness of the fourth lens L4 to the edge thickness thereof, which is likely to increase the difficulty of production.

In some embodiments, the optical imaging system 10 satisfies the following condition:

$$0.35 < (CT1+CT2)/SD1 < 0.5;$$

where CT1 is a thickness of the first lens L1 at an optical axis, CT2 is a thickness of the second lens L2 at the optical axis, and SD1 is a vertical distance between an edge of an effective region of an object side surface S1 of the first lens L1 and the optical axis, that is, (CT1+CT2)/SD1 may be any value in a range of (0.25, 0.5), for example, the value may be 0.46, 0.44, 0.39, 0.61, 0.44, 0.38, 0.40, etc.

By satisfying the aforementioned condition, the reduction of CT1 and CT2 can reduce SD1, thereby reducing the size of the head of the optical imaging system 10, reducing the optical length of the optical imaging system 10, and making it easier to mold and manufacture. In some embodiments, $0.2 < CT \le 0.55$. If $CT1 > 0.55$, $SD1 > 1.9$ can be obtained. At this case, the effective diameter of the first lens L1 is equal to or greater than the effective diameter of the sixth lens L6, and the effective diameters of the first lens L1 and the sixth lens L6 are greatly different from those of the second lens L2 and the third lens L3. This difference increases the difficulty of lens bearing and the arrangement of the lens barrel structure. The light entrance port diameter and the volume of the lens module are large, which is not conducive to the development of miniaturization. If $CT1 < 0.2$, the edge curvature of the first lens L1 increases, and the edge thickness further increases, which is difficult to maintain a proper thickness ratio of the lens.

In some embodiments, the optical imaging system 10 satisfies the following condition:

$$1.2 < (CT3+CT4+CT5)/BF < 2.4;$$

where CT3 is a thickness of the third lens L3 at an optical axis, CT4 is a thickness of the fourth lens L4 at the optical axis, CT5 is a thickness of the fifth lens L5 at the optical axis, and BF is a minimum distance between an image side surface S12 of the sixth lens L6 and an image plane S15 in a direction parallel to the optical axis.

$BF \ge 0.55$. If $BF < 0.55$, it is difficult to provide a proper matching and adjustment interval between the lens and the photosensitive chip. If $CT3 < 0.52$, $CT4 < 0.6$, the third lens L3, the fourth lens L4, and the fifth lens L5 can keep a proper central-thickness and avoid an increase in complexity of the surface shape, which is conducive to the production and injection molding of abrasive tools. If $CT3 > 0.55$, $CT4 > 0.6$, it is difficult to maintain a small TTL due to the increase in size, which is not conducive to maintaining the thin and light characteristics of the system. (CT3+CT4+CT5)/BF may be any value in a range of [1.2, 2.4), for example, the value may be 1.93, 2.13, 2.16, 1.2, 1.82, 2.33, 1.97, etc.

By satisfying the aforementioned condition, it can be ensured that the optical imaging system 10 and the photosensitive chip have enough matching space, which is conducive to the improvement of the assembly yield. In addition, the reasonable configuration of CT3, CT4, and CT5 can reduce the optical length, is beneficial to forming symmetry of the structure, and reduces optical distortion.

In some embodiments, the optical imaging system 10 satisfies the following condition:

$$0.85 < TTL/(ImgH*2) < 1.1$$

where TTL is a distance from an object side surface S1 of the first lens L1 to an imaging plane at an optical axis, and ImgH is half of a diagonal length of an effective imaging region of the optical imaging system on the imaging plane, that is, TTL/(ImgH*2) may be any value in a range of (0.85, 1.1), for example, the value may be 0.89, 1.00, 0.97, 1.02, 0.96, 1.03, 0.95, etc.

By satisfying the aforementioned condition, the total optical length can be compressed, making the structure of the optical imaging system 10 more compact, while maintaining a reasonable distribution of thickness of the lens, which is helpful for molding and assembly. ImgH can be increased properly to obtain support for chips with a large image plane size. When $0.8 < TTL/(ImgH*2) < 1.0$ is satisfied, the optical imaging system 10 has good thickness and volume. At this case, the conflict between the performance of the optical imaging system 10 and TTL is avoided, which is conductive to improving the performance of the optical system, and at the same time keeping light and thin characteristics. ImgH can be increased properly to obtain support for chips with a large image plane size. If TTL/(ImgH*2) <0.75, TTL and materials limit the performance improvement, and adding materials with high refractive indexes will greatly increase the production cost. If $TTL/(ImgH*2) > 1.4$, it is not conductive to realizing the light and thin characteristics of the optical imaging system 10 due to higher TTL.

In some embodiments, at least one surface of at least one lens in the optical imaging system 10 is aspherical. For example, in the first embodiment, the first lens L1, the second lens L2, the third lens L3, the fourth lens L4, the fifth lens L5, and the sixth lens L6 in the optical imaging system 10 are aspherical.

The surface shape of the aspherical surface is determined by the following formula:

$$Z = \frac{cr^2}{1 + \sqrt{1 - (k+1)c^2 r^2}} + \sum Air^i$$

where Z is a longitudinal distance between any point on the aspherical surface and a vertex of the surface, r is a distance between any point on the aspherical surface to the optical axis, the vertex curvature (the reciprocal of the curvature radius) of c, k is a conic constant, and Ai is a correction coefficient of the i-th order of the aspherical surface.

In this way, the optical imaging system 10 can effectively reduce the size of the optical imaging system 10, effectively correct the aberrations, and improve imaging quality, by adjusting the curvature radius and the aspherical coefficient of the surfaces of each lens.

First Embodiment

Figure 2:
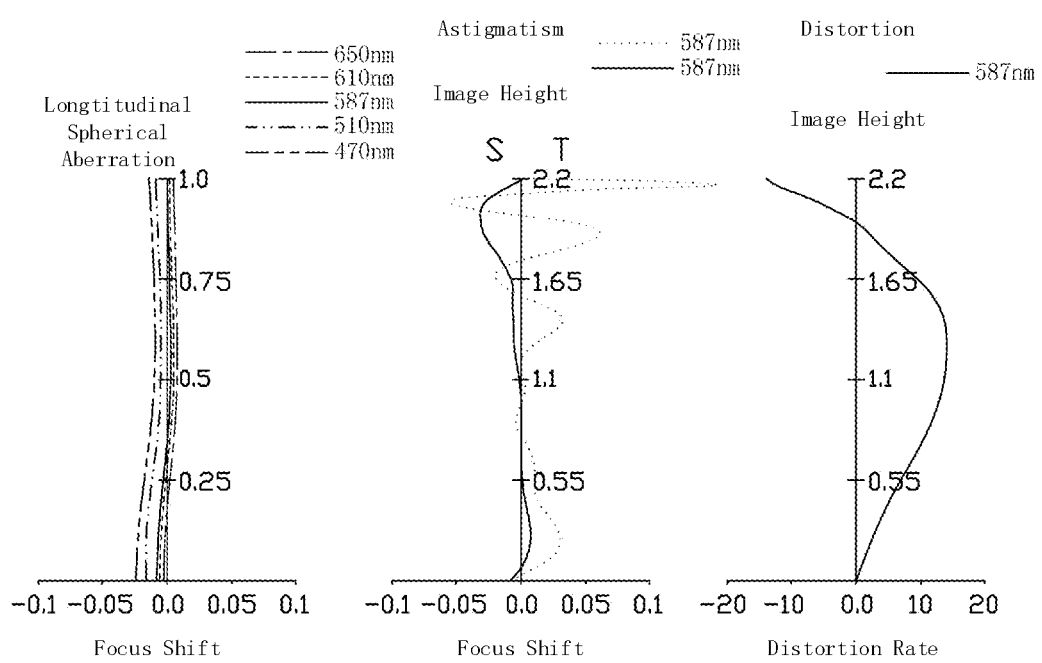
FIG. 2 is a spherical aberration diagram (mm), an astigmatism diagram (mm), and a distortion diagram (%) of the optical imaging system according to the first embodiment of the present disclosure.

Referring to FIG. 1 and FIG. 2, an optical imaging system 10 of the first embodiment includes, sequentially from an object side to an image side, a first lens L1 having negative refractive power, a second lens L2 having negative refractive power, a third lens L3 having positive refractive power, a fourth lens L4 having negative refractive power, a fifth lens L5 having negative refractive power, and a sixth lens L6 having positive refractive power.

An object side surface S1 of the first lens L1 is concave at an optical axis, and an image side surface S2 thereof is concave at the optical axis. An object side surface S3 of the second lens L2 is convex at the optical axis, and an image side surface S4 thereof is concave at the optical axis. An object side surface S5 of the third lens L3 is convex at the optical axis, and an image side surface S6 thereof is convex at the optical axis. An object side surface S7 of the fourth lens L4 is concave at the optical axis, and an image side surface S8 thereof is convex at the optical axis. An object side surface S9 of the fifth lens L5 is convex at the optical axis, and an image side surface S10 thereof is concave at the optical axis, and both the object side surface S9 and the image side surface S10 are aspherical. An object side surface S11 of the sixth lens L6 is convex at the optical axis, and an image side surface S12 thereof is concave at the optical axis, and both the object side surface S11 and the image side surface S12 are aspherical. At least one of the object side surface S11 and the image side surface S12 is provided with at least one inflection point.

The object side surface S1 of the first lens L1 is convex at the circumference, and the image side surface S2 thereof is concave at the circumference. The object side surface S3 of the second lens L2 is convex at the circumference, and the image side surface S4 thereof is concave at the circumference. The object side surface S5 of the third lens L3 is concave at the circumference, and the image side surface S6 thereof is convex at the circumference. The object side surface S7 of the fourth lens L4 is concave at the circumference, and the image side surface S8 thereof is convex at the circumference. The object side surface S9 of the fifth lens L5 is concave at the circumference, and the image side surface S10 thereof is concave at the circumference. The object side surface S11 of the sixth lens L6 is concave at the circumference, and the image side surface S12 thereof is convex at the circumference.

The stop STO is provided between the second lens L2 and the third lens L3.

In the first embodiment, a field of view FOV of the optical imaging system is 134.0°, an effective focal length f is 1.08 mm, FOV/f=124.07°/mm, SD1/CT12=16.38, |DIS/FNO|=6.83%, CT45/ET5=0.22, SAG62/R61=0.44, |R41/ET4|=27.33, (CT1+CT2)/SD1=0.46, (CT3+CT4+CT5)/BF=1.93, and TTL/(ImgH*2)=0.89.

The reference wavelength in the first embodiment is 587 nm, and the optical imaging system 10 in the first embodiment satisfies the conditions of the following table.

TABLE 1

First Embodiment
EFL = 1.08 mm, FNO = 2.05, FOV = 134.0°, TTL = 3.90 mm

| Surface Number | Surface Name | Surface Type | Y radius (mm) | Thickness (mm) | Material | Refractive index | Abbe Number | Focal Length (mm) |
|---|---|---|---|---|---|---|---|---|
| Object Plane | | Spherical | Infinite | Infinite | | | | |
| S1 | First | Aspherical | −1.468 | 0.260 | Plastic | 1.545 | 55.912 | −2.17 |
| S2 | Lens | Aspherical | 6.464 | 0.080 | | | | |
| S3 | Second | Aspherical | 1.316 | 0.340 | Plastic | 1.636 | 23.785 | −102.18 |
| S4 | Lens | Aspherical | 1.160 | 0.342 | | | | |
| Stop | | Spherical | Infinite | 0.036 | | | | |
| S5 | Third | Aspherical | 5.120 | 0.447 | Plastic | 1.545 | 55.912 | 1.41 |
| S6 | Lens | Aspherical | −0.874 | 0.246 | | | | |
| S7 | Fourth | Aspherical | −4.096 | 0.413 | Plastic | 1.545 | 55.912 | −17.89 |
| S8 | Lens | Aspherical | −7.323 | 0.100 | | | | |
| S9 | Fifth | Aspherical | 1.18E+02 | 0.200 | Plastic | 1.661 | 20.412 | −13.71 |
| S10 | Lens | Aspherical | 8.41E+00 | 0.150 | | | | |
| S11 | Sixth | Aspherical | 6.31E−01 | 0.460 | Plastic | 1.535 | 55.796 | 1.88 |
| S12 | Lens | Aspherical | 1.26E+00 | 0.333 | | | | |
| S13 | Infrared | Spherical | Infinite | 0.210 | Glass | 1.517 | 64.167 | |
| S14 | Filter | Spherical | Infinite | 0.286 | | | | |
| Image plane | | Spherical | Infinite | 0.000 | | | | |

It should be noted that EFL is the effective focal length of the optical imaging system 10, FNO is an f-number of the optical imaging system 10, FOV is the field of view of the optical imaging system 10, and TTL is a distance between the object side surface S1 of the first lens L1 to the imaging plane at the optical axis.

TABLE 2

First Embodiment
Aspherical Coefficient

| Surface Number | S1 | S2 | S3 | S4 | S5 | S6 |
|---|---|---|---|---|---|---|
| K | −3.8029E+01 | 5.7213E+01 | 8.1331E−01 | 3.9253E+00 | 6.3895E+01 | 7.2372E−01 |
| A4 | 1.0549E+00 | 3.4611E+00 | 1.0789E+00 | −3.7137E−02 | −1.7939E−01 | 1.3401E−01 |
| A6 | −2.9249E+00 | −1.0966E+01 | −2.2880E+00 | 1.2798E+01 | −4.3684E−01 | 2.2092E+00 |
| A8 | 5.3161E+00 | 1.4692E+01 | −6.8850E+00 | −1.6364E+02 | 1.4994E+01 | −2.6966E+01 |
| A10 | −6.6854E+00 | −1.2659E−01 | 7.8174E+01 | 1.5315E+03 | −3.4239E+02 | 1.4682E+02 |
| A12 | 5.9172E+00 | −1.7355E+01 | −2.5516E+02 | −8.6391E+03 | 2.9964E+03 | −4.2029E+02 |
| A14 | −3.6035E+00 | 1.3285E+01 | 2.5014E+02 | 2.6963E+04 | −1.2550E+04 | 5.4529E+02 |
| A16 | 1.4308E+00 | −3.3390E+00 | 7.1159E+02 | −3.6300E+04 | 2.0571E+04 | −2.0540E+02 |
| A18 | −3.3203E−01 | 0.0000E+00 | −2.1620E+03 | 0.0000E+00 | 0.0000E+00 | 0.0000E+00 |
| A20 | 3.4078E−02 | 0.0000E+00 | 1.6135E+03 | 0.0000E+00 | 0.0000E+00 | 0.0000E+00 |

| Surface Number | S7 | S8 | S9 | S10 | S11 | S12 |
|---|---|---|---|---|---|---|
| K | 1.8897E+01 | 7.1055E+01 | −9.9000E+01 | 5.3072E+01 | −3.5078E+00 | −2.4153E+00 |
| A4 | −2.9437E−01 | −4.7535E+00 | −6.0778E+00 | −3.4965E+00 | −3.9786E−01 | 4.0388E−01 |
| A6 | 8.5436E+00 | 3.2800E+01 | 3.5259E+01 | 1.6124E+01 | 1.0455E+00 | −2.0360E+00 |
| A8 | −8.1864E+01 | −1.5760E+02 | −1.0555E+02 | −3.8016E+01 | −3.1085E+00 | 3.9825E+00 |
| A10 | 4.7847E+02 | 5.4509E+02 | 1.5744E+02 | 5.5752E+01 | 5.8033E+00 | −4.6379E+00 |

TABLE 2-continued

First Embodiment
Aspherical Coefficient

| A12 | −1.8459E+03 | −1.3734E+03 | −1.8160E+01 | −5.3988E+01 | −6.5492E+00 | 3.4335E+00 |
|---|---|---|---|---|---|---|
| A14 | 4.6604E+03 | 2.4455E+03 | −3.5487E+02 | 3.5056E+01 | 4.4504E+00 | −1.6266E+00 |
| A16 | −7.3843E+03 | −2.8688E+03 | 6.1554E+02 | −1.4983E+01 | −1.7766E+00 | 4.7563E−01 |
| A18 | 6.6214E+03 | 1.9486E+03 | −4.5292E+02 | 3.8981E+00 | 3.8386E−01 | −7.7911E−02 |
| A20 | −2.5413E+03 | −5.6747E+02 | 1.2936E+02 | −4.7948E−01 | −3.4663E−02 | 5.4557E−03 |

Second Embodiment

Figure 3:
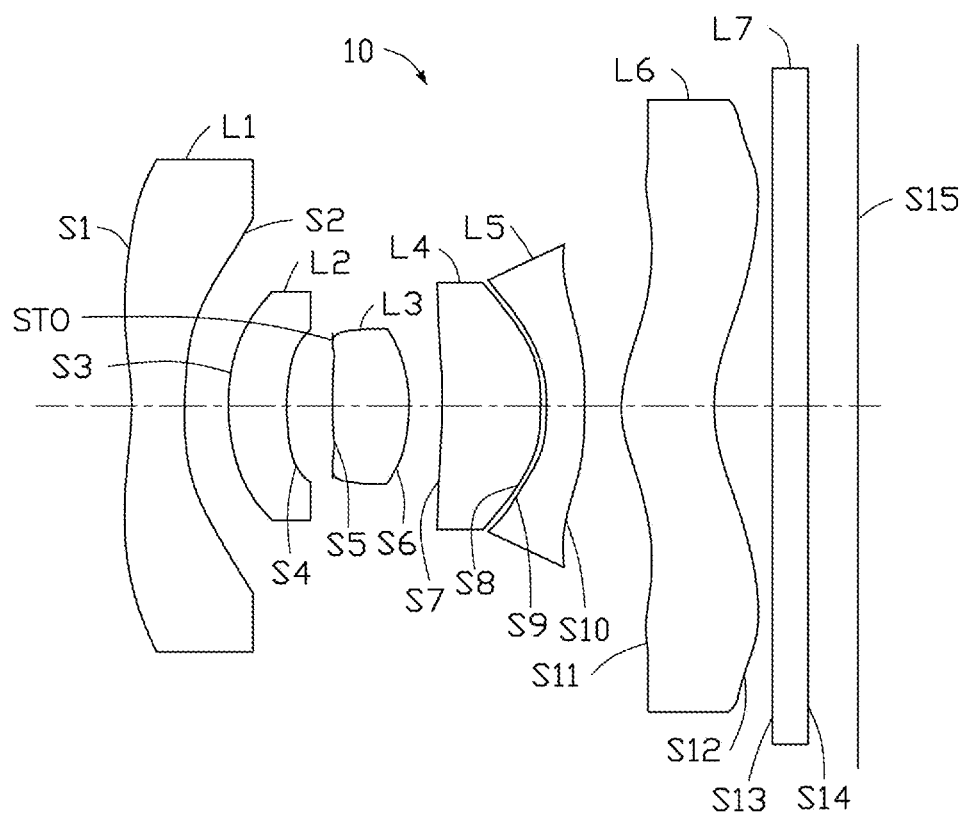
FIG. 3 is a schematic view of an optical imaging system according to a second embodiment of the present disclosure.
Figure 4:
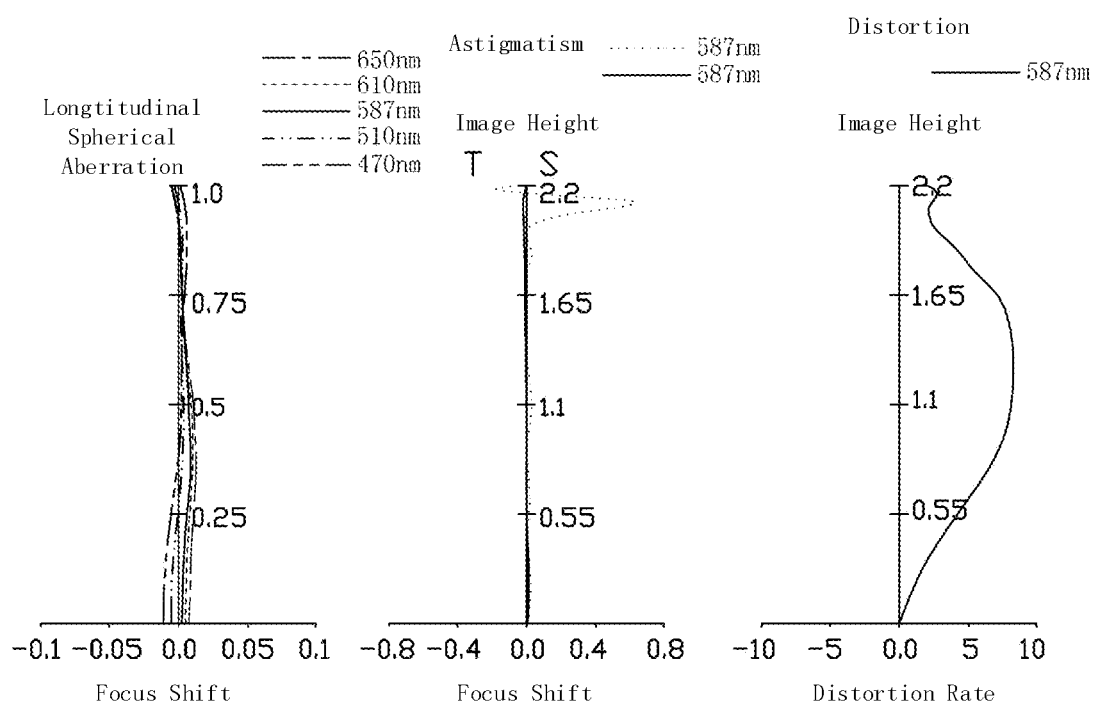
FIG. 4 is a spherical aberration diagram (mm), an astigmatism diagram (mm), and a distortion diagram (%) of the optical imaging system according to the second embodiment of the present disclosure.

Referring to FIG. 3 and FIG. 4, an optical imaging system 10 of the second embodiment includes, sequentially from an object side to an image side, a first lens L1 having negative refractive power, a second lens L2 having positive refractive power, a third lens L3 having positive refractive power, a fourth lens L4 having positive refractive power, a fifth lens L5 having negative refractive power, and a sixth lens L6 having positive refractive power.

An object side surface S1 of the first lens L1 is concave at an optical axis, and an image side surface S2 thereof is concave at the optical axis. An object side surface S3 of the second lens L2 is convex at the optical axis, and an image side surface S4 thereof is concave at the optical axis. An object side surface S5 of the third lens L3 is convex at the optical axis, and an image side surface S6 thereof is convex at the optical axis. An object side surface S7 of the fourth lens L4 is concave at the optical axis, and an image side surface S8 thereof is convex at the optical axis. An object side surface S9 of the fifth lens L5 is concave at the optical axis, an image side surface S10 thereof is concave at the optical axis, and both the object side surface S9 and the image side surface S10 are aspherical. An object side surface S11 of the sixth lens L6 is convex at the optical axis, and an image side surface S12 thereof is concave at the optical axis, and both the object side surface S11 and the image side surface S12 are aspherical. At least one of the object side surface S11 and the image side surface S12 is provided with at least one inflection point.

The object side surface S1 of the first lens L1 is convex at the circumference, and the image side surface S2 thereof is concave at the circumference. The object side surface S3 of the second lens L2 is convex at the circumference, and the image side surface S4 thereof is concave at the circumference. The object side surface S5 of the third lens L3 is convex at the circumference, and the image side surface S6 thereof is convex at the circumference. The object side surface S7 of the fourth lens L4 is concave at the circumference, and the image side surface S8 thereof is convex at the circumference. The object side surface S9 of the fifth lens L5 is concave at the circumference, and the image side surface S10 thereof is concave at the circumference. The object side surface S11 of the sixth lens L6 is concave at the circumference, and the image side surface S12 thereof is convex at the circumference.

The stop STO is provided on the object side surface S5 of the third lens L3.

In the second embodiment, FOV of the optical imaging system is 118.27°, an effective focal length f is 1.29 mm, FOV/f=91.68°/mm, SD1/CT12=5.59, |DIS/FNO|=3.64%, CT45/ET5=0.08, SAG62/R61=0.42, |R41/ET4|=11.41, (CT1+CT2)/SD1=0.44, (CT3+CT4+CT5)/BF=2.13, and TTL/(ImgH*2)=1.00.

The reference wavelength in the second embodiment is 587 nm, and the optical imaging system 10 in the second embodiment satisfies the conditions of the following table.

TABLE 3

Second Embodiment
EFL = 1.29 mm, FNO = 2.25, FOV = 118.27°, TTL = 4.38 mm

| Surface Number | Surface Name | Surface Type | Y radius (mm) | Thickness (mm) | Material | Refractive index | Abbe Number | Focal Length (mm) |
|---|---|---|---|---|---|---|---|---|
| Object Plane | | Spherical | Infinite | Infinite | | | | |
| S1 | First Lens | Aspherical | −1.521 | 0.324 | Plastic | 1.545 | 55.912 | −2.46 |
| S2 | | Aspherical | 11.869 | 0.267 | | | | |
| S3 | Second Lens | Aspherical | 1.472 | 0.348 | Plastic | 1.636 | 23.785 | 12.31 |
| S4 | | Aspherical | 1.647 | 0.275 | | | | |
| Stop | | Spherical | Infinite | 0.005 | | | | |
| S5 | Third Lens | Aspherical | 33.033 | 0.459 | Plastic | 1.545 | 55.912 | 1.60 |
| S6 | | Aspherical | −0.889 | 0.197 | | | | |
| S7 | Fourth Lens | Aspherical | −3.079 | 0.594 | Plastic | 1.545 | 55.912 | 27.46 |
| S8 | | Aspherical | −2.727 | 0.035 | | | | |
| S9 | Fifth Lens | Aspherical | −4.400 | 0.230 | Plastic | 1.661 | 20.412 | −4.34 |
| S10 | | Aspherical | 8.395 | 0.223 | | | | |
| S11 | Sixth Lens | Aspherical | 0.643 | 0.560 | Plastic | 1.535 | 55.796 | 2.2 |
| S12 | | Aspherical | 0.990 | 0.353 | | | | |
| S13 | Infrared Filter | Spherical | Infinite | 0.210 | Glass | 1.517 | 64.167 | |
| S14 | | Spherical | Infinite | 0.305 | | | | |
| Image plane | | Spherical | Infinite | 0.000 | | | | |

It should be noted that EFL is the effective focal length of the optical imaging system 10, FNO is an f-number of the optical imaging system 10, FOV is the field of view of the optical imaging system 10, and TTL is a distance between the object side surface S1 of the first lens L1 to the imaging plane at the optical axis.

TABLE 4

Second Embodiment
Aspherical Coefficient

| Surface Number | S1 | S2 | S3 | S4 | S5 | S6 |
|---|---|---|---|---|---|---|
| K | −2.7391E+01 | 5.7834E+01 | 8.6657E−01 | 8.2283E+00 | −9.9000E+01 | 3.6815E−01 |
| A4 | 5.3204E−01 | 1.6140E+00 | 5.9762E−01 | 7.6536E−01 | 1.1110E−01 | 2.0811E−01 |
| A6 | −1.1511E+00 | −5.2554E+00 | −4.1736E+00 | −5.3146E+00 | −6.9104E+00 | 2.0873E+00 |
| A8 | 1.6884E+00 | 1.1193E+01 | 3.1928E+01 | 1.2569E+02 | 3.0415E+02 | −6.2291E+01 |
| A10 | −1.6985E+00 | −1.6810E+01 | −1.8846E+02 | −1.7161E+03 | −7.9357E+03 | 8.7391E+02 |
| A12 | 1.1863E+00 | 2.0852E+01 | 8.6618E+02 | 1.7539E+04 | 1.2938E+05 | −7.4778E+03 |
| A14 | −5.6523E−01 | −2.2086E+01 | −2.7262E+03 | −1.2070E+05 | −1.3283E+06 | 3.9515E+04 |
| A16 | 1.7473E−01 | 1.6721E+01 | 5.3956E+03 | 5.2452E+05 | 8.3319E+06 | −1.2652E+05 |
| A18 | −3.1459E−02 | −7.2900E+00 | −6.0246E+03 | −1.2822E+06 | −2.9121E+07 | 2.2572E+05 |
| A20 | 2.4950E−03 | 1.3381E+00 | 2.8570E+03 | 1.3283E+06 | 4.3405E+07 | −1.7228E+05 |

| Surface Number | S7 | S8 | S9 | S10 | S11 | S12 |
|---|---|---|---|---|---|---|
| K | −4.3573E+00 | 7.1247E+00 | −4.3332E+00 | 4.9900E+01 | −4.9207E+00 | −4.2973E+00 |
| A4 | 3.2441E−01 | −4.3744E+00 | −5.5731E+00 | −3.5854E+00 | −4.7173E−01 | 1.0038E−02 |
| A6 | 1.7744E+00 | 1.2557E+01 | 1.5981E+01 | 1.8908E+01 | 1.0447E+00 | −4.1905E−01 |
| A8 | −3.2620E+01 | 5.9781E+01 | 8.1040E+01 | −6.7547E+01 | −2.6143E+00 | 7.4127E−01 |
| A10 | 2.6171E+02 | −7.3505E+02 | −9.2661E+02 | 1.8187E+02 | 4.5789E+00 | −7.3051E−01 |
| A12 | −1.2442E+03 | 3.5615E+03 | 4.2309E+03 | −3.4724E+02 | −4.9480E+00 | 4.6274E−01 |
| A14 | 3.6332E+03 | −1.0007E+04 | −1.1301E+04 | 4.3911E+02 | 3.2406E+00 | −1.9159E−01 |
| A16 | −6.4322E+03 | 1.6574E+04 | 1.7967E+04 | −3.4435E+02 | −1.2519E+00 | 4.9421E−02 |
| A18 | 6.3581E+03 | −1.4920E+04 | −1.5634E+04 | 1.5064E+02 | 2.6245E−01 | −7.1032E−03 |
| A20 | −2.6916E+03 | 5.6213E+03 | 5.7152E+03 | −2.8012E+01 | −2.3036E−02 | 4.2995E−04 |

Third Embodiment

Figure 5:
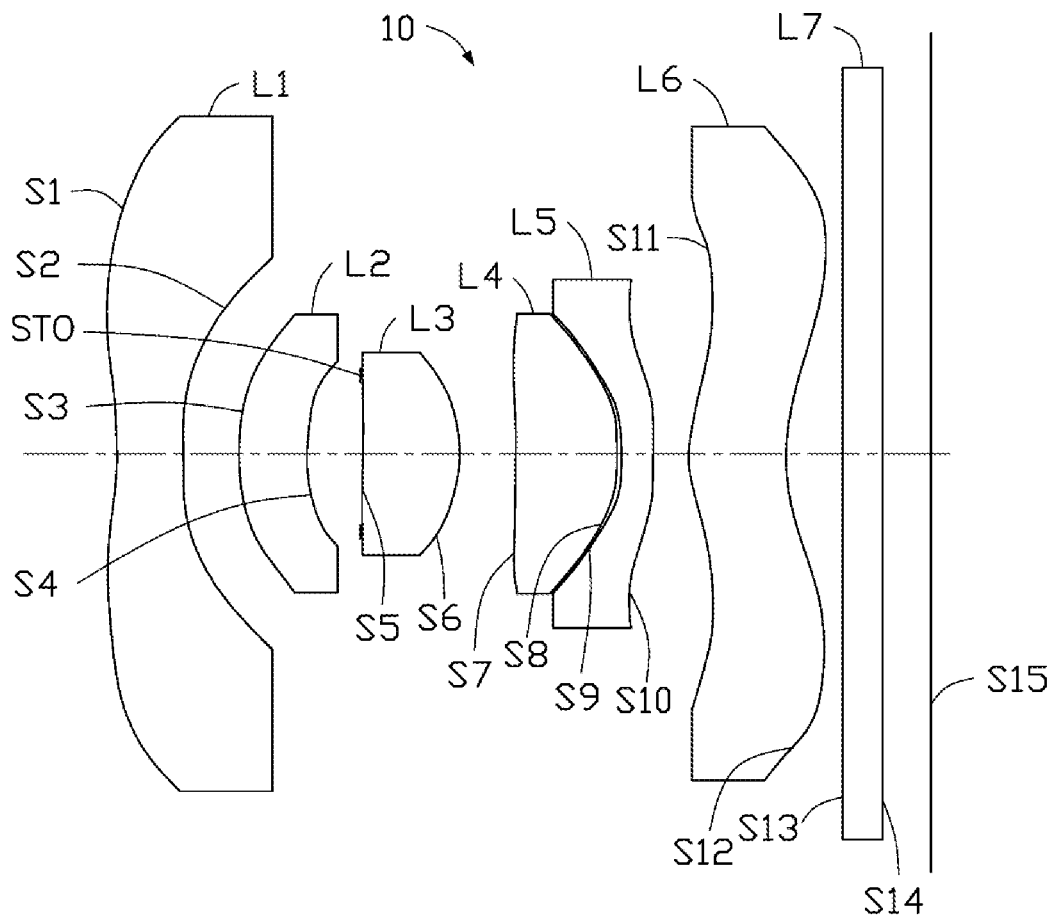
FIG. 5 is a schematic view of an optical imaging system according to a third embodiment of the present disclosure.
Figure 6:
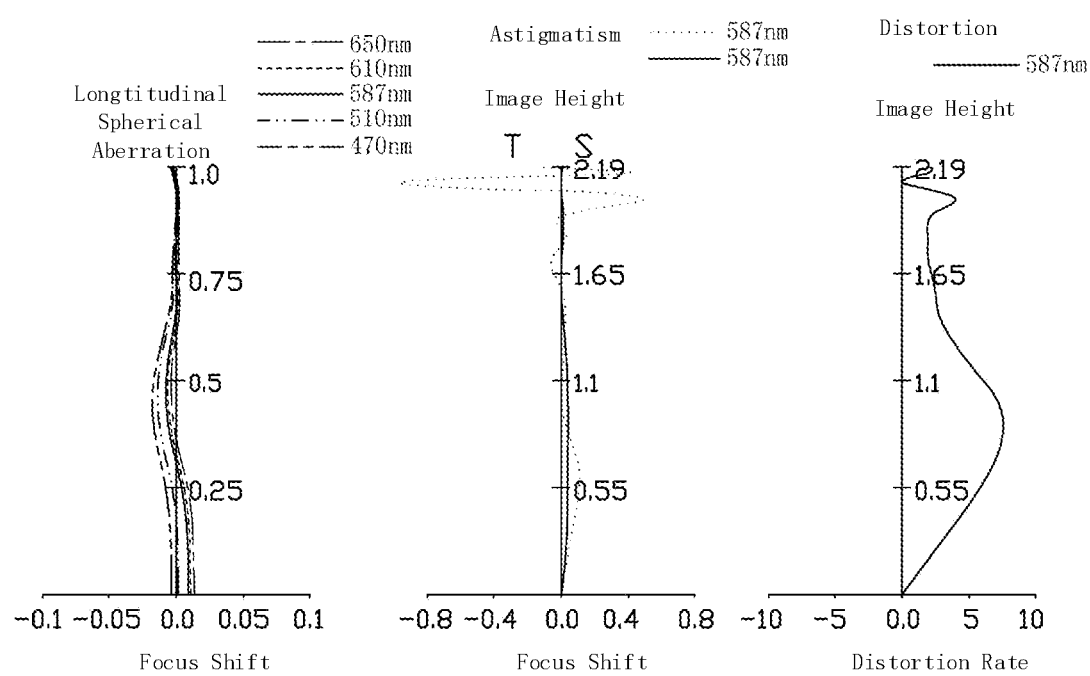
FIG. 6 is a spherical aberration diagram (mm), an astigmatism diagram (mm), and a distortion diagram (%) of the optical imaging system according to the third embodiment of the present disclosure.

Referring to FIG. 5 and FIG. 6, an optical imaging system 10 of the third embodiment includes, sequentially from an object side to an image side, a first lens L1 having negative refractive power, a second lens L2 having positive refractive power, a third lens L3 having positive refractive power, a fourth lens L4 having positive refractive power, a fifth lens L5 having negative refractive power, and a sixth lens L6 having positive refractive power.

An object side surface S1 of the first lens L1 is concave at an optical axis, and an image side surface S2 thereof is concave at the optical axis. An object side surface S3 of the second lens L2 is convex at the optical axis, and an image side surface S4 thereof is concave at the optical axis. An object side surface S5 of the third lens L3 is convex at the optical axis, and an image side surface S6 thereof is convex at the optical axis. An object side surface S7 of the fourth lens L4 is concave at the optical axis, and an image side surface S8 thereof is convex at the optical axis. An object side surface S9 of the fifth lens L5 is concave at the optical axis, an image side surface S10 thereof is concave at the optical axis, and both the object side surface S9 and the image side surface S10 are aspherical. An object side surface S11 of the sixth lens L6 is convex at the optical axis, and an image side surface S12 thereof is concave at the optical axis, and both the object side surface S11 and the image side surface S12 are aspherical. At least one of the object side surface S11 and the image side surface S12 is provided with at least one inflection point.

The object side surface S1 of the first lens L1 is convex at the circumference, and the image side surface S2 thereof is concave at the circumference. The object side surface S3 of the second lens L2 is convex at the circumference, and the image side surface S4 thereof is concave at the circumference. The object side surface S5 of the third lens L3 is concave at the circumference, and the image side surface S6 thereof is convex at the circumference. The object side surface S7 of the fourth lens L4 is convex at the circumference, and the image side surface S8 thereof is convex at the circumference. The object side surface S9 of the fifth lens L5 is concave at the circumference, and the image side surface S10 thereof is concave at the circumference. The object side surface S11 of the sixth lens L6 is concave at the circumference, and the image side surface S12 thereof is convex at the circumference.

The stop STO is provided between the second lens L2 and the third lens L3.

In the third embodiment, FOV of the optical imaging system is 126.2°, an effective focal length f is 1.07 mm, FOV/f=117.94°/mm, SD1/CT12=6.28, |DIS/FNO|=7.89%, CT45/ET5=0.05, SAG62/R61=0.30, |R41/ET4|=20.56, (CT1+CT2)/SD1=0.39, (CT3+CT4+CT5)/BF=2.16, and TTL/(ImgH*2)=0.97.

The reference wavelength in the third embodiment is 587 nm, and the optical imaging system 10 in the third embodiment satisfies the conditions of the following table.

TABLE 5

Third Embodiment
EFL = 1.07 mm, FNO = 1.9, FOV = 126.2°, TTL = 4.29 mm

| Surface Number | Surface Name | Surface Type | Y radius (mm) | Thickness (mm) | Material | Refractive index | Abbe Number | Focal Length (mm) |
|---|---|---|---|---|---|---|---|---|
| Object Plane | | Spherical | Infinite | Infinite | | | | |
| S1 | First Lens | Aspherical | −1.327 | 0.348 | Plastic | 1.545 | 55.912 | 4.89 |
| S2 | | Aspherical | 10.637 | 0.293 | | | | |
| S3 | Second Lens | Aspherical | 1.361 | 0.363 | Plastic | 1.636 | 23.785 | −9.80 |
| S4 | | Aspherical | 1.414 | 0.274 | | | | |
| Stop | | Spherical | Infinite | 0.018 | | | | |
| S5 | Third Lens | Aspherical | 32.411 | 0.506 | Plastic | 1.545 | 55.912 | 9.61 |
| S6 | | Aspherical | −0.820 | 0.300 | | | | |
| S7 | | Aspherical | −3.692 | 0.532 | Plastic | 1.545 | 55.912 | 15.56 |
| S8 | Fourth Lens | Aspherical | −2.601 | 0.022 | | | | |
| S9 | Fifth Lens | Aspherical | −4.181 | 0.170 | Plastic | 1.661 | 20.412 | −125.53 |
| S10 | | Aspherical | 7.777 | 0.184 | | | | |
| S11 | Sixth Lens | Aspherical | 0.661 | 0.515 | Plastic | 1.535 | 55.796 | −331.23 |
| S12 | | Aspherical | 1.355 | 0.300 | | | | |
| S13 | Infrared Filter | Spherical | Infinite | 0.210 | Glass | 1.517 | 64.167 | |
| S14 | | Spherical | Infinite | 0.252 | | | | |
| Image plane | | Spherical | Infinite | 0.000 | | | | |

It should be noted that EFL is the effective focal length of the optical imaging system 10, FNO is an f-number of the optical imaging system 10, FOV is the field of view of the optical imaging system 10, and TTL is a distance between the object side surface S1 of the first lens L1 to the imaging plane at the optical axis.

TABLE 6

Third Embodiment
Aspherical Coefficient

| Surface Number | S1 | S2 | S3 | S4 | S5 | S6 |
|---|---|---|---|---|---|---|
| K | −2.2567E+01 | 7.6191E+01 | 3.9087E−01 | 5.3519E+00 | 9.4464E+01 | 4.6490E−01 |
| A4 | 5.3413E−01 | 1.8759E+00 | 1.3775E+00 | 1.1546E+00 | −8.3166E−02 | 2.3472E−01 |
| A6 | −1.1059E+00 | −5.0496E+00 | −1.9641E+01 | −2.9704E+01 | 1.3731E+00 | −1.6171E+00 |
| A8 | 1.4208E+00 | 2.2435E+00 | 2.0328E+02 | 7.6622E+02 | −1.1011E+02 | 2.3756E+01 |
| A10 | −1.1746E+00 | 2.7508E+01 | −1.3400E+03 | −1.2242E+04 | 1.8541E+03 | −2.2490E+02 |
| A12 | 6.3931E−01 | −8.8988E+01 | 5.6636E+03 | 1.2506E+05 | −1.4593E+04 | 1.1197E+03 |
| A14 | −2.2710E−01 | 1.3424E+02 | −1.5152E+04 | −8.0047E+05 | 5.3414E+04 | −2.8128E+03 |
| A16 | 5.0584E−02 | −1.1135E+02 | 2.4742E+04 | 3.0859E+06 | −7.1977E+04 | 2.7941E+03 |
| A18 | −6.4053E−03 | 4.8554E+01 | −2.2474E+04 | −6.5252E+06 | 0.0000E+00 | 0.0000E+00 |
| A20 | 3.5165E−04 | −8.6699E+00 | 8.6826E+03 | 5.7970E+06 | 0.0000E+00 | 0.0000E+00 |

| Surface Number | S7 | S8 | S9 | S10 | S11 | S12 |
|---|---|---|---|---|---|---|
| K | −6.5170E+00 | 8.1268E+00 | 6.4011E+00 | 6.1316E+01 | −8.8766E+00 | −7.9548E+00 |
| A4 | 4.4952E−01 | −3.6796E+00 | −5.6647E+00 | −4.8264E+00 | −1.5226E−01 | 4.5865E−01 |
| A6 | −1.3734E+00 | −1.1903E+01 | −7.2694E+00 | 2.8107E+01 | −1.5065E−01 | −1.4556E+00 |
| A8 | 9.3508E+00 | 3.0663E+02 | 3.9648E+02 | −1.0107E+02 | −8.8916E−01 | 2.0040E+00 |
| A10 | −4.2102E+01 | −1.8201E+03 | −2.7211E+03 | 2.5069E+02 | 3.5175E+00 | −1.7936E+00 |
| A12 | 9.1715E+01 | 5.5644E+03 | 9.5983E+03 | −4.2272E+02 | −4.7402E+00 | 1.1121E+00 |
| A14 | −3.4704E+01 | −9.7936E+03 | −2.0082E+04 | 4.6894E+02 | 3.2348E+00 | −4.6187E−01 |
| A16 | −2.4174E+02 | 9.9374E+03 | 2.5253E+04 | −3.2510E+02 | −1.2010E+00 | 1.1893E−01 |
| A18 | 4.4704E+02 | −5.3674E+03 | −1.7750E+04 | 1.2723E+02 | 2.3099E−01 | −1.6804E−02 |
| A20 | −2.4314E+02 | 1.1892E+03 | 5.3890E+03 | −2.1463E+01 | −1.7994E−02 | 9.8075E−04 |

Fourth Embodiment

Figure 7:
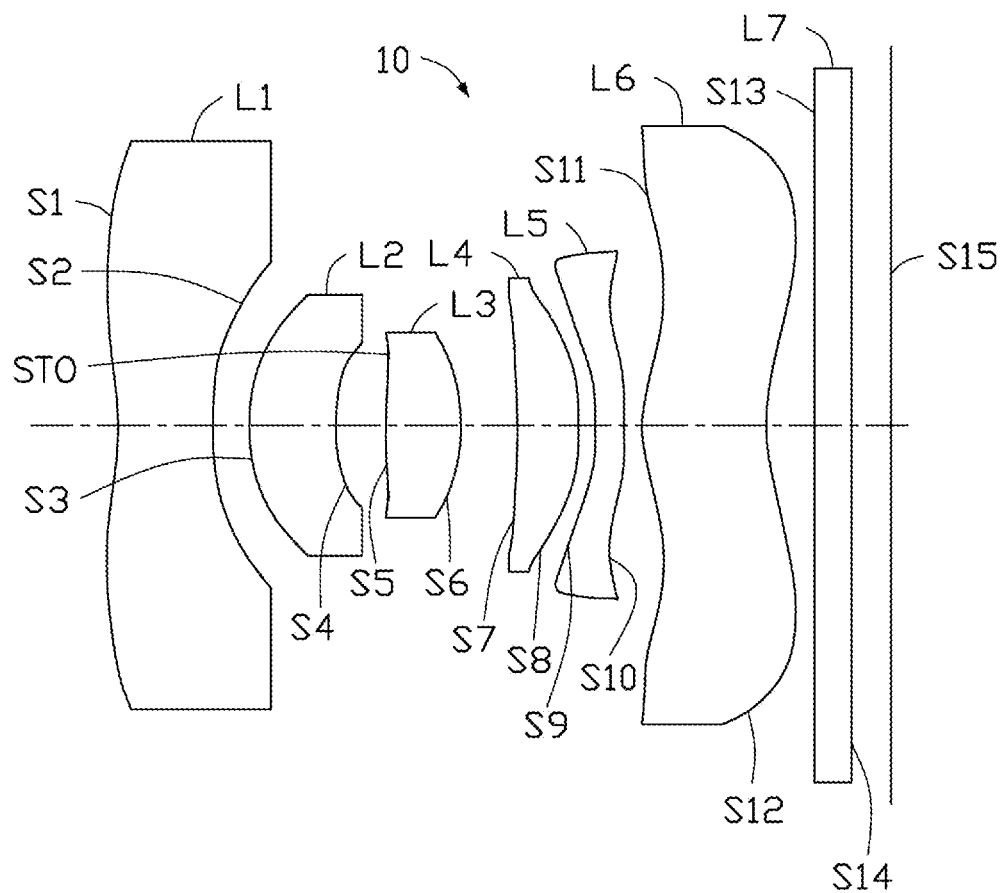
FIG. 7 is a schematic view of an optical imaging system according to a fourth embodiment of the present disclosure.
Figure 8:
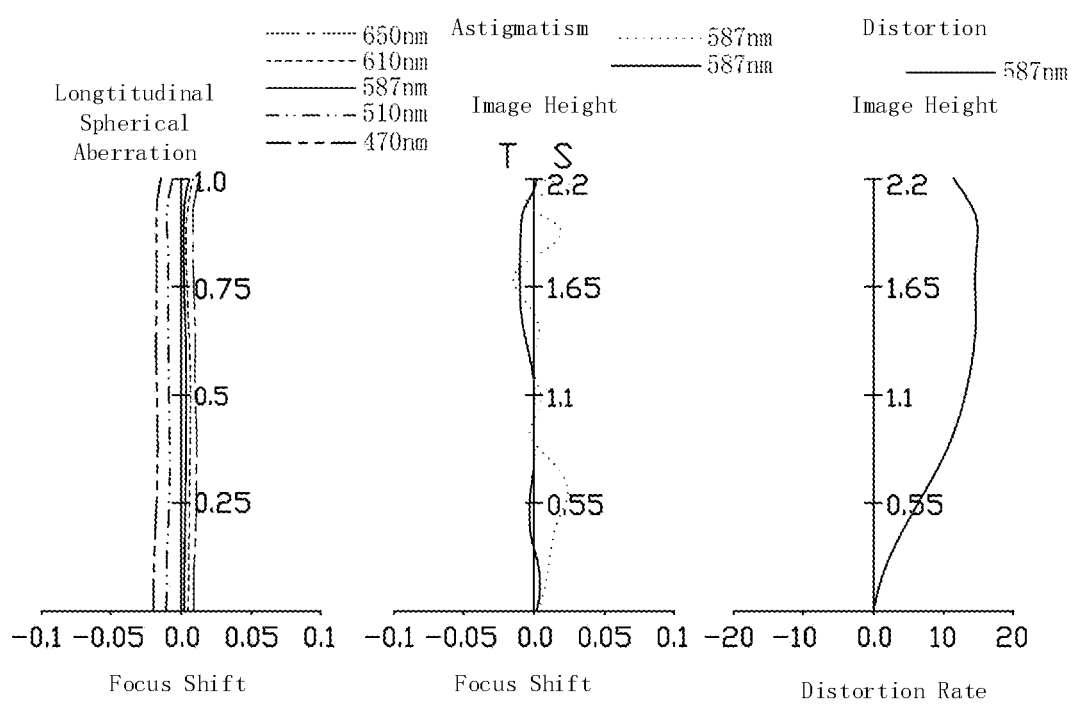
FIG. 8 is a spherical aberration diagram (mm), an astigmatism diagram (mm), and a distortion diagram (%) of the optical imaging system according to the fourth embodiment of the present disclosure.

Referring to FIG. 7 and FIG. 8, an optical imaging system 10 of the fourth embodiment includes, sequentially from an object side to an image side, a first lens L1 having negative refractive power, a second lens L2 having positive refractive power, a third lens L3 having positive refractive power, a fourth lens L4 having negative refractive power, a fifth lens L5 having negative refractive power, and a sixth lens L6 having positive refractive power.

An object side surface S1 of the first lens L1 is concave at an optical axis, and an image side surface S2 thereof is concave at the optical axis. An object side surface S3 of the second lens L2 is convex at the optical axis, and an image side surface S4 thereof is concave at the optical axis. An object side surface S5 of the third lens L3 is convex at the optical axis, and an image side surface S6 thereof is convex at the optical axis. An object side surface S7 of the fourth lens L4 is concave at the optical axis, and an image side surface S8 thereof is convex at the optical axis. An object side surface S9 of the fifth lens L5 is convex at the optical axis, and an image side surface S10 thereof is concave at the optical axis, and both the object side surface S9 and the image side surface S10 are aspherical. An object side surface S11 of the sixth lens L6 is convex at the optical axis, and an image side surface S12 thereof is concave at the optical axis, and both the object side surface S11 and the image side surface S12 are aspherical. At least one of the object side surface S11 and the image side surface S12 is provided with at least one inflection point.

The object side surface S1 of the first lens L1 is convex at the circumference, and the image side surface S2 thereof is concave at the circumference. The object side surface S3 of the second lens L2 is convex at the circumference, and the image side surface S4 thereof is concave at the circumference. The object side surface S5 of the third lens L3 is convex at the circumference, and the image side surface S6 thereof is convex at the circumference. The object side surface S7 of the fourth lens L4 is concave at the circumference, and the image side surface S8 thereof is convex at the circumference. The object side surface S9 of the fifth lens L5 is concave at the circumference, and the image side surface S10 thereof is concave at the circumference. The object side surface S11 of the sixth lens L6 is concave at the circumference, and the image side surface S12 thereof is convex at the circumference.

The stop STO is provided on the object side surface S5 of the third lens L3.

In the fourth embodiment, FOV of the optical imaging system is 117.43°, an effective focal length f is 1.2 mm, FOV/f=87.86°/mm, SD1/CT12=8.19, |DIS/FNO|=7.05%, CT45/ET5=0.27, SAG62/R61=0.22, |R41/ET4|=33.92, (CT1+CT2)/SD1=0.61, (CT3+CT4+CT5)/BF=1.2, and TTL/(ImgH*2)=1.02.

The reference wavelength in the fourth embodiment is 587 nm, and the optical imaging system 10 in the fourth embodiment satisfies the conditions of the following table.

TABLE 7

Fourth Embodiment
EFL = 1.20 mm, FNO = 2.1, FOV = 117.43°, TTL = 4.47 mm

| Surface Number | Surface Name | Surface Type | Y radius (mm) | Thickness (mm) | Material | Refractive index | Abbe Number | Focal Length (mm) |
|---|---|---|---|---|---|---|---|---|
| Object Plane | | Spherical | Infinite | Infinite | | | | |
| S1 | First Lens | Aspherical | −1.500 | 0.552 | Plastic | 1.545 | 55.912 | −2.33 |
| S2 | | Aspherical | 9.263 | 0.205 | | | | |
| S3 | Second Lens | Aspherical | 1.249 | 0.501 | Plastic | 1.636 | 23.785 | 9.03 |
| S4 | | Aspherical | 1.348 | 0.301 | | | | |
| Stop | | Spherical | Infinite | −0.011 | | | | |
| S5 | Third Lens | Aspherical | 6.544 | 0.435 | Plastic | 1.545 | 55.912 | 1.67 |
| S6 | | Aspherical | −1.033 | 0.325 | | | | |
| S7 | Fourth Lens | Aspherical | −4.071 | 0.349 | Plastic | 1.545 | 55.912 | −14.32 |
| S8 | | Aspherical | −8.787 | 0.100 | | | | |
| S9 | Fifth Lens | Aspherical | 30.384 | 0.170 | Plastic | 1.661 | 20.412 | −16.86 |
| S10 | | Aspherical | 8.134 | 0.103 | | | | |
| S11 | Sixth Lens | Aspherical | 0.761 | 0.720 | Plastic | 1.535 | 55.796 | 2.09 |
| S12 | | Aspherical | 1.600 | 0.276 | | | | |
| S13 | Infrared Filter | Spherical | Infinite | 0.210 | Glass | 1.517 | 64.167 | |
| S14 | | Spherical | Infinite | 0.229 | | | | |
| Image plane | | Spherical | Infinite | 0.000 | | | | |

It should be noted that EFL is the effective focal length of the optical imaging system 10, FNO is an f-number of the optical imaging system 10, FOV is the field of view of the optical imaging system 10, and TTL is a distance between the object side surface S1 of the first lens L1 to the imaging plane at the optical axis.

TABLE 8

Fourth Embodiment
Aspherical Coefficient

| Surface Number | S1 | S2 | S3 | S4 | S5 | S6 |
|---|---|---|---|---|---|---|
| K | −2.1098E+01 | 7.3450E+01 | 4.3341E−01 | 5.1655E+00 | −9.9000E+01 | 6.2521E−01 |
| A4 | 3.1805E−01 | 1.6289E+00 | 8.0320E−01 | 5.7855E−01 | 1.1615E−01 | 9.4479E−02 |
| A6 | −4.7129E−01 | −4.4961E+00 | −4.4086E+00 | −2.5073E+00 | 1.6931E+00 | 8.7986E−01 |
| A8 | 4.6572E−01 | 7.8503E+00 | 2.3780E+01 | 4.9298E+01 | −6.2010E+01 | −1.2609E+01 |
| A10 | −3.1707E−01 | −1.1017E+01 | −1.1130E+02 | −5.3627E+02 | 1.1871E+03 | 8.9416E+01 |
| A12 | 1.5097E−01 | 1.5103E+01 | 3.8708E+02 | 4.2202E+03 | −1.1962E+04 | −4.0137E+02 |
| A14 | −4.9196E−02 | −1.8005E+01 | −9.0509E+02 | −2.1295E+04 | 6.1021E+04 | 9.9098E+02 |

TABLE 8-continued

Fourth Embodiment
Aspherical Coefficient

| A16 | 1.0416E−02 | 1.5213E+01 | 1.3482E+03 | 6.7279E+04 | −1.2367E+05 | −9.7344E+02 |
|---|---|---|---|---|---|---|
| A18 | −1.2875E−03 | −7.7473E+00 | −1.1569E+03 | −1.2495E+05 | 0.0000E+00 | 0.0000E+00 |
| A20 | 7.0394E−05 | 1.7636E+00 | 4.2827E+02 | 1.0289E+05 | 0.0000E+00 | 0.0000E+00 |

| Surface Number | S7 | S8 | S9 | S10 | S11 | S12 |
|---|---|---|---|---|---|---|
| K | 1.4279E+01 | 8.9943E+01 | 9.9000E+01 | 5.4786E+01 | −7.6777E+00 | −3.9181E+00 |
| A4 | −1.4791E−01 | −3.8331E+00 | −4.5498E+00 | −3.4690E+00 | −4.8844E−01 | 1.3140E−01 |
| A6 | 4.4443E+00 | 2.3988E+01 | 2.0223E+01 | 1.6236E+01 | 1.2074E+00 | −1.0149E+00 |
| A8 | −3.0855E+01 | −1.1583E+02 | −3.4651E+01 | −4.4179E+01 | −3.2726E+00 | 2.0812E+00 |
| A10 | 1.4758E+02 | 4.5197E+02 | −3.0411E+01 | 8.9956E+01 | 6.1220E+00 | −2.5057E+00 |
| A12 | −5.0950E+02 | −1.3146E+03 | 2.8507E+02 | −1.4064E+02 | −7.0535E+00 | 1.9090E+00 |
| A14 | 1.2155E+03 | 2.6300E+03 | −6.6195E+02 | 1.5691E+02 | 4.9142E+00 | −9.2346E−01 |
| A16 | −1.8857E+03 | −3.3673E+03 | 8.0867E+02 | −1.1337E+02 | −2.0156E+00 | 2.7340E−01 |
| A18 | 1.6875E+03 | 2.4624E+03 | −5.2295E+02 | 4.6704E+01 | 4.4797E−01 | −4.5046E−02 |
| A20 | −6.5032E+02 | −7.7548E+02 | 1.4052E+02 | −8.2756E+00 | −4.1628E−02 | 3.1573E−03 |

Fifth Embodiment

Figure 9:
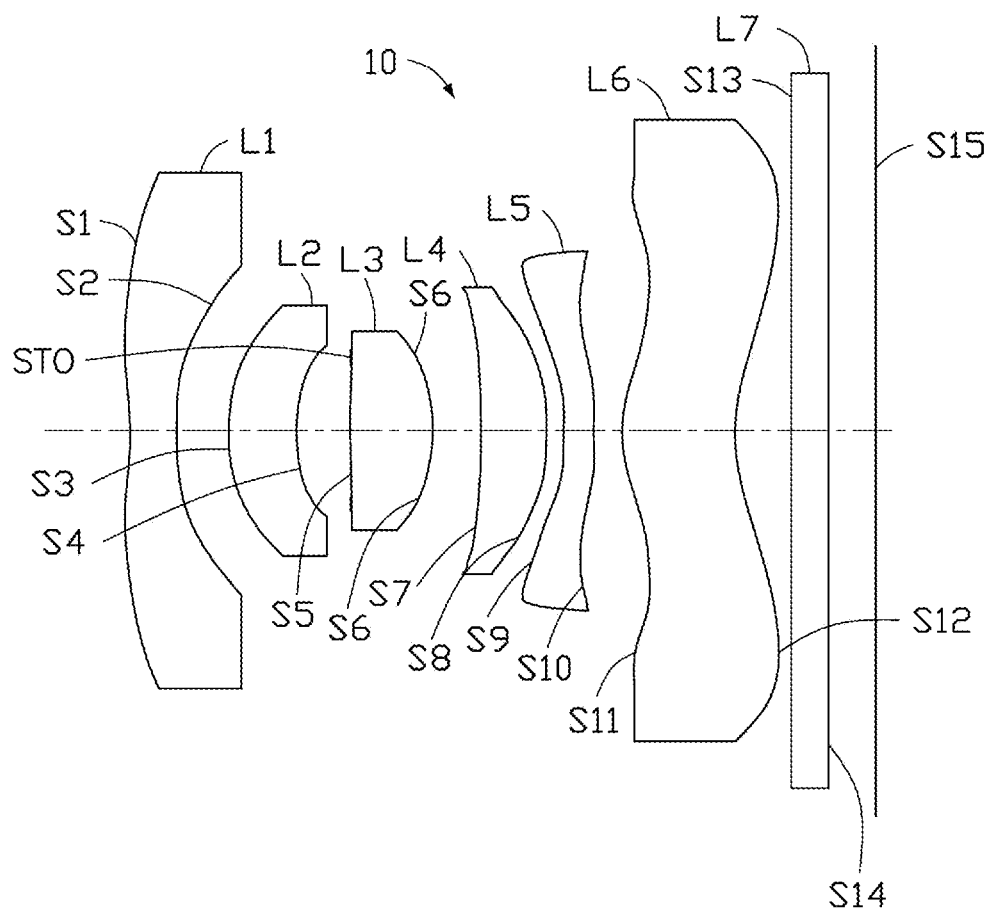
FIG. 9 is a schematic view of an optical imaging system according to a fifth embodiment of the present disclosure.
Figure 10:
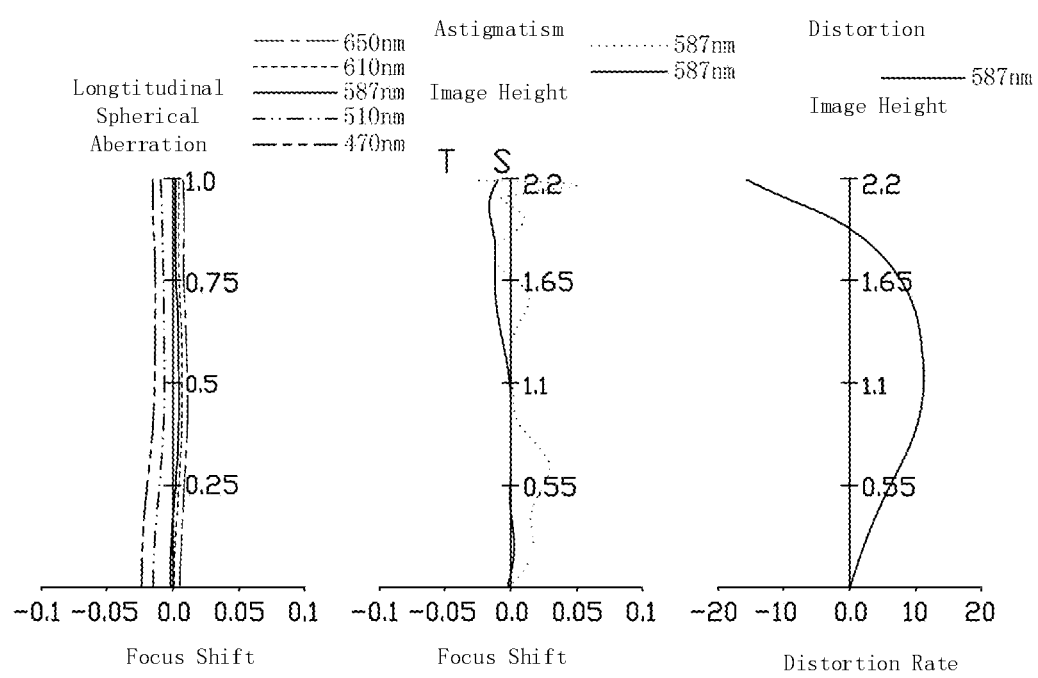
FIG. 10 is a spherical aberration diagram (mm), an astigmatism diagram (mm), and a distortion diagram (%) of the optical imaging system according to the fifth embodiment of the present disclosure.

Referring to FIG. 9 and FIG. 10, an optical imaging system 10 of the fifth embodiment includes, sequentially from an object side to an image side, a first lens L1 having negative refractive power, a second lens L2 having positive refractive power, a third lens L3 having positive refractive power, a fourth lens L4 having negative refractive power, a fifth lens L5 having negative refractive power, and a sixth lens L6 having positive refractive power.

An object side surface S1 of the first lens L1 is concave at an optical axis, and an image side surface S2 thereof is concave at the optical axis. An object side surface S3 of the second lens L2 is convex at the optical axis, and an image side surface S4 thereof is concave at the optical axis. An object side surface S5 of the third lens L3 is convex at the optical axis, and an image side surface S6 is convex at the optical axis. An object side surface S7 of the fourth lens L4 is concave at the optical axis, and an image side surface S8 thereof is convex at the optical axis. An object side surface S9 of the fifth lens L5 is convex at the optical axis, an image side surface S10 thereof is concave at the optical axis, and both the object side surface S9 and the image side surface S10 are aspherical. An object side surface S11 of the sixth lens L6 is convex at the optical axis, and an image side surface S12 thereof is concave at the optical axis, and both the object side surface S11 and the image side surface S12 are aspherical. At least one of the object side surface S11 and the image side surface S12 is provided with at least one inflection point.

The object side surface S1 of the first lens L1 is convex at the circumference, and the image side surface S2 thereof is concave at the circumference. The object side surface S3 of the second lens L2 is convex at the circumference, and the image side surface S4 thereof is concave at the circumference. The object side surface S5 of the third lens L3 is convex at the circumference, and the image side surface S6 thereof is convex at the circumference. The object side surface S7 of the fourth lens L4 is concave at the circumference, and the image side surface S8 thereof is convex at the circumference. The object side surface S9 of the fifth lens L5 is concave at the circumference, and the image side surface S10 thereof is concave at the circumference. The object side surface S11 of the sixth lens L6 is convex at the circumference, and the image side surface S12 thereof is convex at the circumference.

The stop STO is provided on the object side surface S5 of the third lens L3.

In the fifth embodiment, FOV of the optical imaging system is 130°, an effective focal length f is 1.22 mm, FOV/f=106.56°/mm, SD1/CT12=4.8, |DIS/FNO|=5.89%, CT45/ET5=0.26, SAG62/R61=0.32, |R41/ET4|=28.43, (CT1+CT2)/SD1=0.44, (CT3+CT4+CT5)/BF=1.82, and TTL/(ImgH*2)=0.96.

The reference wavelength in the fifth embodiment is 587 nm, and the optical imaging system 10 in the fifth embodiment satisfies the conditions of the following table.

TABLE 9

Fifth Embodiment
EFL = 1.22 mm, FNO = 2.05, FOV = 130.0°, TTL = 4.21 mm

| Surface Number | Surface Name | Surface Type | Y radius (mm) | Thickness (mm) | Material | Refractive index | Abbe Number | Focal Length (mm) |
|---|---|---|---|---|---|---|---|---|
| Object Plane | | Spherical | Infinite | Infinite | | | | |
| S1 | First Lens | Aspherical | −1.481 | 0.260 | Plastic | 1.545 | 55.912 | −2.28 |
| S2 | | Aspherical | 8.172 | 0.301 | | | | |
| S3 | Second Lens | Aspherical | 1.216 | 0.380 | Plastic | 1.636 | 23.785 | 10.90 |
| S4 | | Aspherical | 1.296 | 0.308 | | | | |
| Stop | | Spherical | Infinite | −0.002 | | | | |
| S5 | Third Lens | Aspherical | 8.623 | 0.464 | Plastic | 1.545 | 55.912 | 1.62 |
| S6 | | Aspherical | −0.960 | 0.273 | | | | |

TABLE 9-continued

Fifth Embodiment
EFL = 1.22 mm, FNO = 2.05, FOV = 130.0°, TTL = 4.21 mm

| Surface Number | Surface Name | Surface Type | Y radius (mm) | Thickness (mm) | Material | Refractive index | Abbe Number | Focal Length (mm) |
|---|---|---|---|---|---|---|---|---|
| S7 | Fourth | Aspherical | −3.977 | 0.367 | Plastic | 1.545 | 55.912 | −15.78 |
| S8 | Lens | Aspherical | −7.648 | 0.100 | | | | |
| S9 | Fifth Lens | Aspherical | 64.787 | 0.170 | Plastic | 1.661 | 20.412 | −14.27 |
| S10 | | Aspherical | 8.222 | 0.161 | | | | |
| S11 | Sixth | Aspherical | 0.745 | 0.640 | Plastic | 1.535 | 55.796 | 2.21 |
| S12 | Lens | Aspherical | 1.412 | 0.315 | | | | |
| S13 | Infrared | Spherical | Infinite | 0.210 | Glass | 1.517 | 64.167 | |
| S14 | Filter | Spherical | Infinite | 0.268 | | | | |
| Image plane | | Spherical | Infinite | 0.000 | | | | |

It should be noted that EFL is the effective focal length of the optical imaging system 10, FNO is an f-number of the optical imaging system 10, FOV is the field of view of the optical imaging system 10, and TTL is a distance between the object side surface S1 of the first lens L1 to the imaging plane at the optical axis.

TABLE 10

Fifth Embodiment
Aspherical Coefficient

| Surface Number | S1 | S2 | S3 | S4 | S5 | S6 |
|---|---|---|---|---|---|---|
| K | −3.3124E+01 | 6.4615E+01 | 5.6585E−01 | 5.1799E+00 | −9.9000E+01 | 7.6005E−01 |
| A4 | 7.3809E−01 | 2.0430E+00 | 5.3774E−01 | 5.1788E−01 | −6.1796E−02 | 8.8055E−02 |
| A6 | −1.7332E+00 | −6.4540E+00 | −4.1993E+00 | −3.5234E+00 | 1.6436E+00 | 1.9616E+00 |
| A8 | 2.6309E+00 | 1.3129E+01 | 3.4213E+01 | 6.9785E+01 | −4.0270E+01 | −2.8109E+01 |
| A10 | −2.7657E+00 | −1.9579E+01 | −2.1239E+02 | −6.9916E+02 | 5.0100E+02 | 1.9077E+02 |
| A12 | 2.0397E+00 | 2.1537E+01 | 9.3008E+02 | 4.1186E+03 | −3.7140E+03 | −7.4819E+02 |
| A14 | −1.0285E+00 | −1.4692E+01 | −2.6982E+03 | −1.2273E+04 | 1.4748E+04 | 1.5454E+03 |
| A16 | 3.3525E−01 | 4.3437E+00 | 4.9641E+03 | 1.3570E+04 | −2.3908E+04 | −1.2972E+03 |
| A18 | −6.3383E−02 | 0.0000E+00 | −5.2472E+03 | 0.0000E+00 | 0.0000E+00 | 0.0000E+00 |
| A20 | 5.2677E−03 | 0.0000E+00 | 2.4008E+03 | 0.0000E+00 | 0.0000E+00 | 0.0000E+00 |

| Surface Number | S7 | S8 | S9 | S10 | S11 | S12 |
|---|---|---|---|---|---|---|
| K | 1.8301E+01 | 7.5516E+01 | −9.9000E+01 | 5.4093E+01 | −5.6371E+00 | −2.9840E+00 |
| A4 | −2.6342E−01 | −3.9617E+00 | −5.1543E+00 | −3.5149E+00 | −4.5193E−01 | 1.5510E−01 |
| A6 | 6.1827E+00 | 2.6394E+01 | 2.6144E+01 | 1.6461E+01 | 1.1114E+00 | −9.0970E−01 |
| A8 | −4.5046E+01 | −1.3117E+02 | −5.5968E+01 | −4.0362E+01 | −3.1322E+00 | 1.5728E+00 |
| A10 | 2.0813E+02 | 5.1727E+02 | −2.7650E+00 | 6.4605E+01 | 5.8521E+00 | −1.5992E+00 |
| A12 | −6.9060E+02 | −1.5736E+03 | 2.9912E+02 | −7.3329E+01 | −6.6633E+00 | 1.0483E+00 |
| A14 | 1.6429E+03 | 3.3705E+03 | −7.3114E+02 | 6.0470E+01 | 4.5762E+00 | −4.4811E−01 |
| A16 | −2.6293E+03 | −4.6068E+03 | 8.6049E+02 | −3.4836E+01 | −1.8477E+00 | 1.2040E−01 |
| A18 | 2.4691E+03 | 3.5412E+03 | −5.2038E+02 | 1.2399E+01 | 4.0409E−01 | −1.8429E−02 |
| A20 | −1.0019E+03 | −1.1531E+03 | 1.2951E+02 | −2.0179E+00 | −3.6978E−02 | 1.2242E−03 |

Sixth Embodiment

Figure 11:
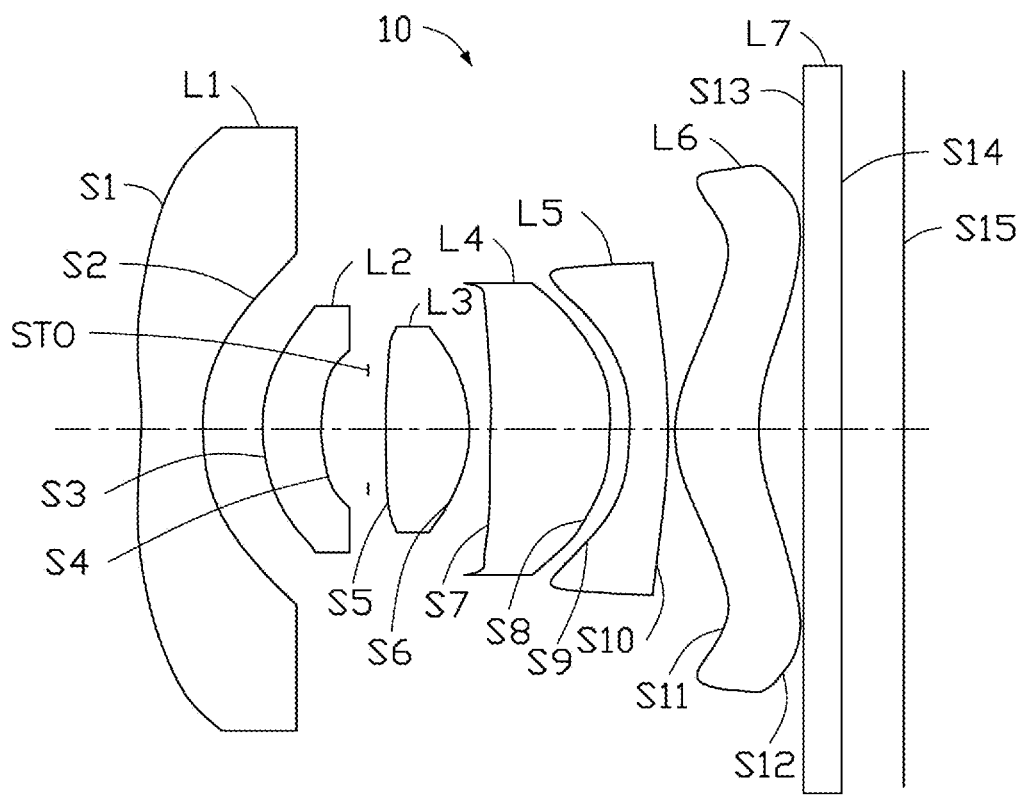
FIG. 11 is a schematic view of an optical imaging system according to a sixth embodiment of the present disclosure.
Figure 12:
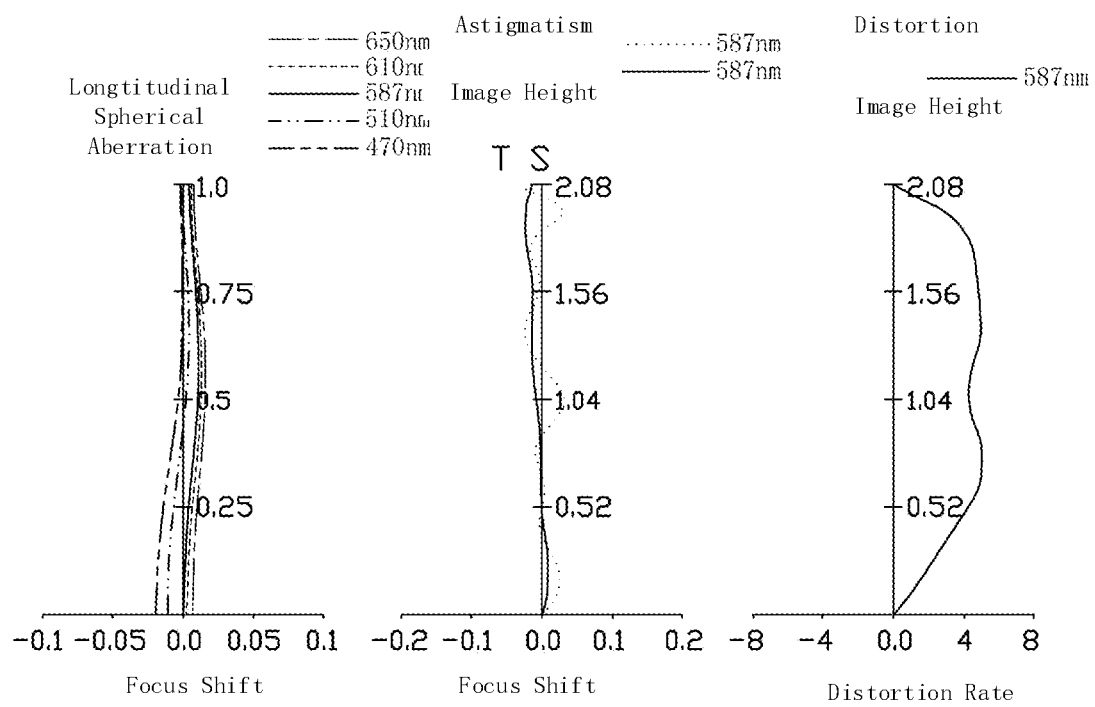
FIG. 12 is a spherical aberration diagram (mm), an astigmatism diagram (mm), and a distortion diagram (%) of the optical imaging system according to the sixth embodiment of the present disclosure.

Referring to FIG. 11 and FIG. 12, an optical imaging system 10 of the sixth embodiment includes, sequentially from an object side to an image side, a first lens L1 having negative refractive power, a second lens L2 having positive refractive power, a third lens L3 having positive refractive power, a fourth lens L4 having positive refractive power, a fifth lens L5 having negative refractive power, and a sixth lens L6 having positive refractive power.

An object side surface S1 of the first lens L1 is concave at an optical axis, and an image side surface S2 thereof is concave at the optical axis. Object side surface S3 of the second lens L2 is convex at the optical axis, and an image side surface S4 thereof is concave at the optical axis. An object side surface S5 of the third lens L3 is convex at the optical axis, and an image side surface S6 thereof is convex at the optical axis. An object side surface S7 of the fourth lens L4 is concave at the optical axis, and an image side surface S8 thereof is convex at the optical axis. An object side surface S9 of the fifth lens L5 is concave at the optical axis, an image side surface S10 thereof is concave at the optical axis, and both the object side surface S9 and the image side surface S10 are aspherical. An object side surface S11 of the sixth lens L6 is concave at the optical axis, and an image side surface S12 thereof is concave at the optical axis, and both the object side surface S11 and the image side surface S12 are aspherical. At least one of the object side surface S11 and the image side surface S12 is provided with at least one inflection point.

The object side surface S1 of the first lens L1 is convex at the circumference, and the image side surface S2 thereof is concave at the circumference. The object side surface S3 of the second lens L2 is convex at the circumference, and the image side surface S4 thereof is concave at the circumference. The object side surface S5 of the third lens L3 is convex at the circumference, and the image side surface S6 thereof is convex at the circumference. The object side surface S7 of the fourth lens L4 is concave at the circumference, and the image side surface S8 thereof is convex at the circumference. The object side surface S9 of the fifth lens L5 is concave at the circumference, and the image side surface S10 thereof is concave at the circumference. The object side surface S11 of the sixth lens L6 is concave at the circumference, and the image side surface S12 thereof is convex at the circumference.

The stop STO is provided between the second lens L2 and the third lens L3.

In the sixth embodiment, FOV of the optical imaging system is 126.58°, an effective focal length f is 1.05 mm, FOV/f=120.55°/mm, SD1/CT12=5.18, |DIS/FNO|=2.12%, CT45/ET5=0.19, SAG62/R61=0.31, |R41/ET4|=13.74, (CT1+CT2)/SD1=0.38, (CT3+CT4+CT5)/BF=2.33, and TTL/(ImgH*2)=1.03.

The reference wavelength in the sixth embodiment is 587 nm, and the optical imaging system 10 in the sixth embodiment satisfies the conditions of the following table.

TABLE 11

Sixth Embodiment
EFL = 1.05 mm, FNO = 2.35, FOV = 126.58°, TTL = 4.29 mm

| Surface Number | Surface Name | Surface Type | Y radius (mm) | Thickness (mm) | Material | Refractive index | Abbe Number | Focal Length (mm) |
|---|---|---|---|---|---|---|---|---|
| Object Plane | | Spherical | Infinite | Infinite | | | | |
| S1 | First Lens | Aspherical | −1.886 | 0.344 | Plastic | 1.545 | 55.912 | −1.57 |
| S2 | | Aspherical | 1.662 | 0.337 | | | | |
| S3 | Second Lens | Aspherical | 1.010 | 0.334 | Plastic | 1.636 | 23.785 | 6.70 |
| S4 | | Aspherical | 1.154 | 0.261 | | | | |
| Stop | | Spherical | Infinite | 0.100 | | | | |
| S5 | Third Lens | Aspherical | 4.982 | 0.466 | Plastic | 1.545 | 55.912 | 1.32 |
| S6 | | Aspherical | −0.809 | 0.128 | | | | |
| S7 | Fourth Lens | Aspherical | −3.712 | 0.671 | Plastic | 1.545 | 55.912 | 42.15 |
| S8 | | Aspherical | −3.398 | 0.105 | | | | |
| S9 | Fifth Lens | Aspherical | −7.089 | 0.210 | Plastic | 1.661 | 20.412 | −5.57 |
| S10 | | Aspherical | 8.005 | 0.050 | | | | |
| S11 | Sixth Lens | Aspherical | 0.743 | 0.472 | Plastic | 1.535 | 55.796 | 2.47 |
| S12 | | Aspherical | 1.318 | 0.251 | | | | |
| S13 | Infrared Filter | Spherical | Infinite | 0.210 | Glass | 1.517 | 64.167 | |
| S14 | | Spherical | Infinite | 0.353 | | | | |
| Image plane | | Spherical | Infinite | 0.000 | | | | |

It should be noted that EFL is the effective focal length of the optical imaging system 10, FNO is an f-number of the optical imaging system 10, FOV is the field of view of the optical imaging system 10, and TTL is a distance between the object side surface S1 of the first lens L1 to the imaging plane at the optical axis.

TABLE 12

Sixth Embodiment
Aspherical Coefficient

| Surface Number | S1 | S2 | S3 | S4 | S5 | S6 |
|---|---|---|---|---|---|---|
| K | −5.3320E+01 | −8.2347E+00 | −9.9669E−01 | 3.9714E+00 | −3.0806E+01 | 1.1707E−01 |
| A4 | 5.3193E−01 | 1.7717E+00 | 3.4663E−01 | 3.2587E−01 | −6.2098E−03 | 5.0903E−01 |
| A6 | −1.0406E+00 | −5.4643E+00 | −2.0946E+00 | 3.3142E+00 | −8.3621E−02 | −1.1741E+00 |
| A8 | 1.3588E+00 | 1.2435E+01 | 1.9655E+01 | −1.0801E+02 | 2.7212E+00 | 4.7106E+00 |
| A10 | −1.2052E+00 | −2.6015E+01 | −1.6004E+02 | 2.0587E+03 | −1.0228E+01 | −4.1121E+01 |
| A12 | 7.2958E−01 | 4.8315E+01 | 9.0639E+02 | −2.1043E+04 | 2.3806E+01 | 2.1476E+02 |
| A14 | −2.9516E−01 | −6.5658E+01 | −3.1365E+03 | 1.2801E+05 | 0.0000E+00 | −5.0378E+02 |
| A16 | 7.6078E−02 | 5.7239E+01 | 6.3901E+03 | −4.6481E+05 | 0.0000E+00 | 4.8639E+02 |
| A18 | −1.1270E−02 | −2.8482E+01 | −7.0836E+03 | 9.4307E+05 | 0.0000E+00 | 0.0000E+00 |
| A20 | 7.2926E−04 | 6.1582E+00 | 3.2837E+03 | −8.3987E+05 | 0.0000E+00 | 0.0000E+00 |

| Surface Number | S7 | S8 | S9 | S10 | S11 | S12 |
|---|---|---|---|---|---|---|
| K | 1.3534E+01 | 1.2905E+01 | −4.7443E+01 | 5.3240E+01 | −5.5337E+00 | −7.6477E+00 |
| A4 | 4.3490E−01 | −4.2186E+00 | −5.2787E+00 | −1.8542E+00 | 8.7017E−01 | 7.5724E−01 |
| A6 | 7.6374E−01 | 2.0729E+01 | 2.1872E+01 | 8.0141E+00 | −4.7784E+00 | −3.2925E+00 |
| A8 | −1.5131E+01 | −5.1896E+01 | −6.4426E−02 | −1.6705E+01 | 1.2194E+01 | 6.2937E+00 |
| A10 | 9.3197E+01 | 4.1973E+01 | −3.5128E+02 | 1.4564E+01 | −1.8809E+01 | −6.9937E+00 |

TABLE 12-continued

Sixth Embodiment
Aspherical Coefficient

| | | | | | | |
|---|---|---|---|---|---|---|
| A12 | −3.6843E+02 | 1.2560E+02 | 1.5033E+03 | 5.7728E+00 | 1.8819E+01 | 4.8960E+00 |
| A14 | 9.6067E+02 | −4.4104E+02 | −3.2159E+03 | −2.5875E+01 | −1.2386E+01 | −2.2160E+00 |
| A16 | −1.6035E+03 | 6.0878E+02 | 3.9098E+03 | 2.5050E+01 | 5.1424E+00 | 6.3293E−01 |
| A18 | 1.5439E+03 | −4.1665E+02 | −2.5674E+03 | −1.0988E+01 | −1.2095E+00 | −1.0395E−01 |
| A20 | −6.4117E+02 | 1.1836E+02 | 7.0691E+02 | 1.8539E+00 | 1.2199E−01 | 7.4780E−03 |

Seventh Embodiment

Figure 13:
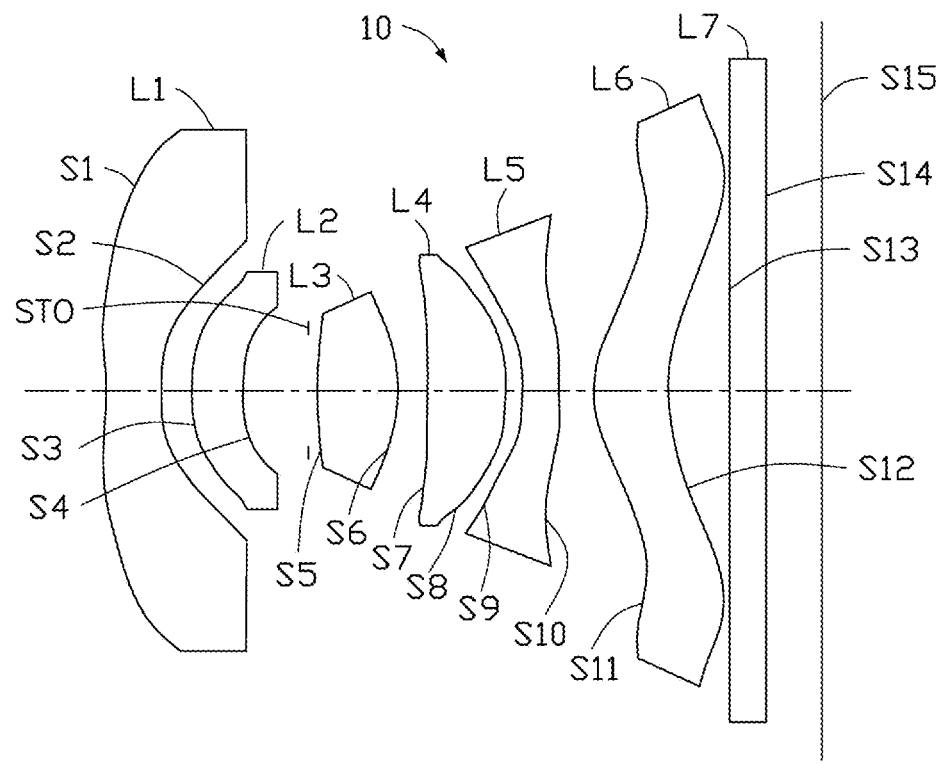
FIG. 13 is a schematic view of an optical imaging system according to a seventh embodiment of the present disclosure.
Figure 14:
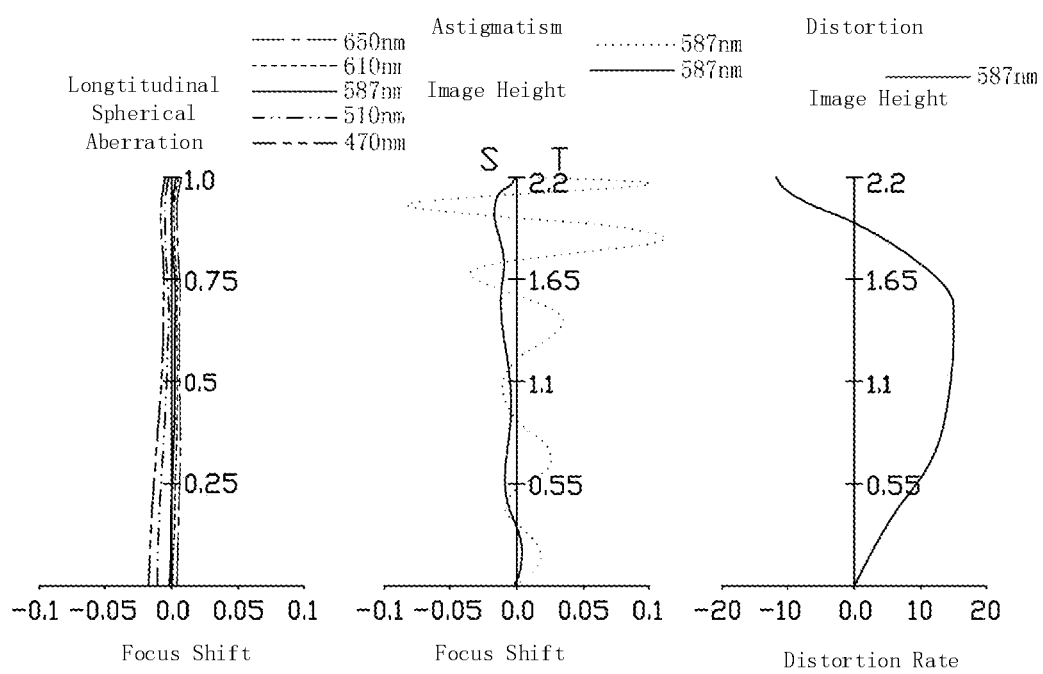
FIG. 14 is a spherical aberration diagram (mm), an astigmatism diagram (mm), and a distortion diagram (%) of the optical imaging system according to the seventh embodiment of the present disclosure.

Referring to FIG. 13 and FIG. 14, an optical imaging system 10 of the seventh embodiment includes, sequentially from an object side to an image side, a first lens L1 having negative refractive power, a second lens L2 having negative refractive power, a third lens L3 having positive refractive power, a fourth lens L4 having negative refractive power, a fifth lens L5 having negative refractive power, and a sixth lens L6 having positive refractive power.

An object side surface S1 of the first lens L1 is concave at an optical axis, and an image side surface S2 thereof is concave at the optical axis. An object side surface S3 of the second lens L2 is convex at the optical axis, and an image side surface S4 thereof is concave at the optical axis. An object side surface S5 of the third lens L3 is convex at the optical axis, and an image side surface S6 thereof is convex at the optical axis. An object side surface S7 of the fourth lens L4 is concave at the optical axis, and an image side surface S8 thereof is convex at the optical axis. An object side surface S9 of the fifth lens L5 is convex at the optical axis, an image side surface S10 thereof is concave at the optical axis, and both the object side surface S9 and the image side surface S10 are aspherical. An object side surface S11 of the sixth lens L6 is convex at the optical axis, and an image side surface S12 thereof is concave at the optical axis, and both the object side surface S11 and the image side surface S12 are aspherical. At least one of the object side surface S11 and the image side surface S12 is provided with at least one inflection point.

The object side surface S1 of the first lens L1 is convex at the circumference, and the image side surface S2 thereof is concave at the circumference. The object side surface S3 of the second lens L2 is convex at the circumference, and the image side surface S4 thereof is concave at the circumference. The object side surface S5 of the third lens L3 is convex at the circumference, and the image side surface S6 thereof is convex at the circumference. The object side surface S7 of the fourth lens L4 is convex at the circumference, and the image side surface S8 thereof is convex at the circumference. The object side surface S9 of the fifth lens L5 is concave at the circumference, and the image side surface S10 thereof is concave at the circumference. The object side surface S11 of the sixth lens L6 is concave at the circumference, and the image side surface S12 thereof is convex at the circumference.

The stop STO is provided between the second lens L2 and the third lens L3.

In the seventh embodiment, a field of view FOV of the optical imaging system is 134.4°, an effective focal length f is 1.05 mm, FOV/f=128°/mm, SD1/CT12=8.67, |DIS|/FNO|=6.98%, CT45/ET5=0.20, SAG62/R61=0.46, |R41/ET4|=71.20, (CT1+CT2)/SD1=0.40, (CT3+CT4+CT5)/BF=1.97, and TTL/(ImgH*2)=0.95.

The reference wavelength in the seventh embodiment is 587 nm, and the optical imaging system 10 in the seventh embodiment satisfies the conditions of the following table.

TABLE 13

Seventh Embodiment
EFL = 1.05 mm, FNO = 2.15, FOV = 134.4°, TTL = 4.19 mm

| Surface Number | Surface Name | Surface Type | Y radius (mm) | Thickness (mm) | Material | Refractive index | Abbe Number | Focal Length (mm) |
|---|---|---|---|---|---|---|---|---|
| Object Plane | | Spherical | Infinite | Infinite | | | | |
| S1 | First Lens | Aspherical | −1.453 | 0.324 | Plastic | 1.545 | 55.912 | −2.16 |
| S2 | | Aspherical | 6.631 | 0.177 | | | | |
| S3 | Second Lens | Aspherical | 1.457 | 0.300 | Plastic | 1.636 | 23.785 | −27.60 |
| S4 | | Aspherical | 1.238 | 0.383 | | | | |
| Stop | | Spherical | Infinite | 0.056 | | | | |
| S5 | Third Lens | Aspherical | 3.723 | 0.469 | Plastic | 1.545 | 55.912 | 1.51 |
| S6 | | Aspherical | −1.010 | 0.173 | | | | |
| S7 | Fourth Lens | Aspherical | −7.123 | 0.454 | Plastic | 1.545 | 55.912 | 496.62 |
| S8 | | Aspherical | −7.096 | 0.100 | | | | |
| S9 | Fifth Lens | Aspherical | 257.175 | 0.220 | Plastic | 1.661 | 20.412 | −13.04 |
| S10 | | Aspherical | 8.333 | 0.203 | | | | |
| S11 | Sixth Lens | Aspherical | 0.709 | 0.430 | Plastic | 1.535 | 55.796 | 2.03 |
| S12 | | Aspherical | 1.605 | 0.371 | | | | |
| S13 | Infrared Filter | Spherical | Infinite | 0.210 | Glass | 1.517 | 64.167 | |
| S14 | | Spherical | Infinite | 0.324 | | | | |
| Image plane | | Spherical | Infinite | 0.000 | | | | |

It should be noted that EFL is the effective focal length of the optical imaging system 10, FNO is an f-number of the optical imaging system 10, FOV is the field of view of the optical imaging system 10, and TTL is a total length of the optical imaging system 10.

TABLE 14

Seventh Embodiment
Aspherical Coefficient

| Surface Number | S1 | S2 | S3 | S4 | S5 | S6 |
|---|---|---|---|---|---|---|
| K   | −4.3588E+01 | 5.3264E+01  | 1.5447E+00  | 2.9836E+00  | 6.1708E+01  | 4.4323E−01  |
| A4  | 1.1481E+00  | 4.3605E+00  | 2.2316E+00  | 1.0026E+00  | −1.8523E−01 | 2.4128E−01  |
| A6  | −3.1065E+00 | −1.2270E+01 | −1.0968E+01 | 1.8526E+00  | 3.5233E+00  | 2.0448E+00  |
| A8  | 5.0788E+00  | −4.1129E−01 | 3.6379E+01  | −6.7954E+01 | −7.9132E+01 | −3.0881E+01 |
| A10 | −5.4233E+00 | 8.1170E+01  | −2.7676E+01 | 8.3902E+02  | 9.5177E+02  | 2.1439E+02  |
| A12 | 3.8959E+00  | −1.8903E+02 | −5.0976E+02 | −4.4027E+03 | −6.5959E+03 | −7.8755E+02 |
| A14 | −1.8653E+00 | 1.7990E+02  | 3.2516E+03  | 1.1025E+04  | 2.4159E+04  | 1.5299E+03  |
| A16 | 5.6974E−01  | −6.3974E+01 | −9.0380E+03 | −1.1295E+04 | −3.7315E+04 | −1.2119E+03 |
| A18 | −1.0023E−01 | 0.0000E+00  | 1.1948E+04  | 0.0000E+00  | 0.0000E+00  | 0.0000E+00  |
| A20 | 7.7239E−03  | 0.0000E+00  | −6.0943E+03 | 0.0000E+00  | 0.0000E+00  | 0.0000E+00  |

| Surface Number | S7 | S8 | S9 | S10 | S11 | S12 |
|---|---|---|---|---|---|---|
| K   | 2.3102E+01  | 7.0670E+01  | 5.7384E+01  | 5.2308E+01  | −2.3786E+00 | −1.3158E+00 |
| A4  | −2.3922E−02 | −5.6804E+00 | −7.1876E+00 | −3.2394E+00 | −2.5437E−01 | 7.7658E−01  |
| A6  | 2.4759E+00  | 4.0819E+01  | 3.8270E+01  | 1.3794E+01  | 3.7477E−01  | −2.8019E+00 |
| A8  | −1.7542E+01 | −2.2283E+02 | −9.3057E+01 | −2.8015E+01 | −1.3569E+00 | 4.5927E+00  |
| A10 | 5.1373E+01  | 9.4812E+02  | 5.4207E+01  | 2.9737E+01  | 2.7659E+00  | −4.6096E+00 |
| A12 | −4.2321E+01 | −2.9495E+03 | 2.9904E+02  | −1.0947E+01 | −3.0873E+00 | 2.9946E+00  |
| A14 | −1.4953E+02 | 6.2118E+03  | −9.2151E+02 | −1.0217E+01 | 1.9746E+00  | −1.2621E+00 |
| A16 | 4.2666E+02  | −8.2460E+03 | 1.2397E+03  | 1.4238E+01  | −7.2237E−01 | 3.3179E−01  |
| A18 | −3.9200E+02 | 6.1762E+03  | −8.4626E+02 | −6.6303E+00 | 1.4075E−01  | −4.9227E−02 |
| A20 | 1.1532E+02  | −1.9757E+03 | 2.3725E+02  | 1.1392E+00  | −1.1344E−02 | 3.1371E−03  |

Figure 15:
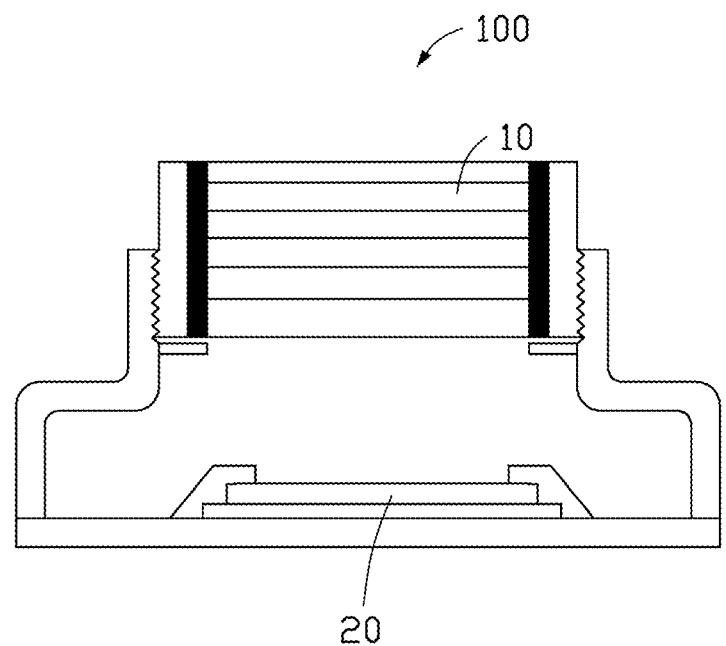
FIG. 15 is a schematic view of an image capturing module according to an embodiment of the present disclosure.

Please refer to FIG. 15, an image capturing module 100 according to an embodiment of the present disclosure includes the optical imaging system 10 and a photosensitive element 20, and the photosensitive element 20 is disposed on the image side of the optical imaging system 10.

Specifically, the photosensitive element 20 may be a complementary metal oxide semiconductor (CMOS) image sensor or a charge-coupled device (CCD).

By the aforementioned reasonable configuration of refractive powers, the image capturing module 100 of the embodiment of the present disclosure can improve the ability of the optical imaging system 10 to capture low-frequency details, effectively reduce distortion of the edge field of view, increase the f-number, realize both a wide viewing angle and higher imaging quality, and reduce the size of the optical imaging system 10, thereby realizing the miniaturization of the optical imaging system 10.

Figure 16:
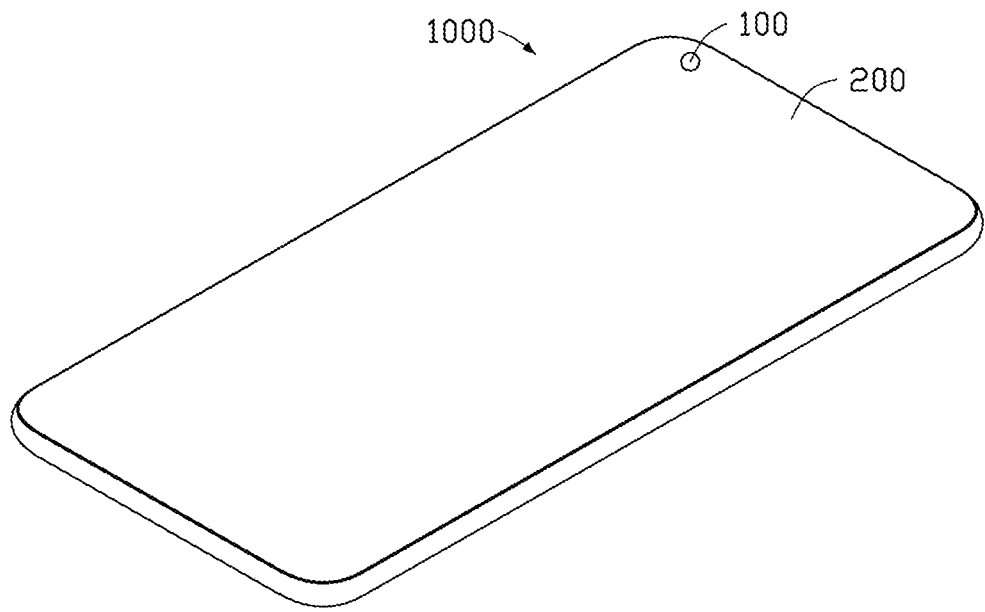
FIG. 16 is a schematic view of an electronic device according to an embodiment of the present disclosure.

Referring to FIG. 16, an electronic device 1000 according to an embodiment of the present disclosure includes a housing 200 and the image capturing module 100, and the image capturing module 100 is mounted on the housing 200.

The electronic device 1000 of the embodiment of the present disclosure includes, but is not limited to, a smart phone, a tablet computer, a notebook computer, an electronic book reader, a portable multimedia player (PMP), a portable phone, a video phone, a digital still camera, a mobile medical device, a wearable device and other electronic devices that achieve imaging.

The optical imaging system 10 in the electronic device 1000 of the aforementioned embodiment can improve the ability to capture low-frequency details, effectively reduce distortion of the edge field of view, increase the f-number, and realize both the wide viewing angle and higher imaging quality, via reasonable configuration of refractive powers.

For those skilled in the art, it is obvious that the present disclosure is not limited to the details of the aforementioned exemplary embodiments, and the present disclosure can be implemented in other specific forms without departing from the spirit or basic characteristics of the present disclosure. Therefore, no matter from which point of view, the embodiments should be regarded as exemplary and non-limiting. The scope of the present disclosure is defined by the appended claims rather than the aforementioned description, and therefore it is intended to fall into the claims. All changes in the meaning and scope of the equivalent elements of are included in the present disclosure.

Finally, it should be noted that the aforementioned embodiments are only used to illustrate the technical solutions of the present disclosure and not to limit them. Although the present disclosure has been described in detail with reference to the preferred embodiments, those of ordinary skill in the art should understand that the technical solutions of the present disclosure can be described in detail. Modifications or equivalent replacements are made without departing from the spirit and scope of the technical solution of the present disclosure.

What is claimed is:

1. An optical imaging system, comprising, sequentially from an object side to an image side:
    a first lens having negative refractive power;
    a second lens having refractive power;
    a third lens having positive refractive power;
    a fourth lens having refractive power;
    a fifth lens having negative refractive power; and
    a sixth lens having positive refractive power;
    the optical imaging system satisfies the following condition:

$87.0°/\text{mm} < FOV/f \leq 128.0°/\text{mm};$ wherein FOV is a maximum field of view of the optical imaging system, and f is an effective focal length of the optical imaging system;

$$4.5 < SD1/CT12 < 16.5;$$

wherein SD1 is a vertical distance from an edge of an optical effective region of an object side surface of the first lens to an optical axis, and CT12 is a distance between an image side surface of the first lens and an object side surface of the second lens at the optical axis.

2. The optical imaging system according to claim 1, wherein,
an object side surface of the first lens is concave at an optical axis, and an image side surface thereof is concave at the optical axis;
an object side surface of the second lens is convex at the optical axis, and an image side surface thereof is concave at the optical axis;
an object side surface of the third lens is convex at the optical axis, and an image side surface thereof is convex at the optical axis;
an object side surface of the fourth lens is concave at the optical axis, and an image side surface thereof is convex at the optical axis;
an object side surface of the fifth lens is concave at a circumference, an image side surface thereof is concave at the circumference, and both the object side surface and the image side surface thereof are aspherical; and
an object side surface of the sixth lens is convex at the optical axis, an image side surface thereof is concave at the optical axis, both the object side surface and the image side surface thereof are aspherical, and at least one of the object side surface and the image side surface thereof is provided with at least one inflection point.

3. The optical imaging system according to claim 1, further comprising a stop disposed between the second lens and the third lens.

4. The optical imaging system according to claim 1, wherein the optical imaging system satisfies the following condition:

$$2.0\% < |DIS/FNO| < 8.0\%;$$

wherein DIS is a maximum value of an optical distortion of the optical imaging system, and FNO is an f-number of the optical imaging system.

5. The optical imaging system according to claim 1, wherein the optical imaging system satisfies the following condition:

$$CT45/ET5 < 0.30;$$

wherein CT45 is a distance between an image side surface of the fourth lens and an object side surface of the fifth lens at an optical axis, and ET5 is a thickness of an edge of an optical effective region of the fifth lens.

6. The optical imaging system according to claim 1, wherein the optical imaging system satisfies the following condition:

$$0.2 < SAG62/R61 < 0.5;$$

wherein SAG62 is a maximum sagittal height of an image side surface of the sixth lens, and R61 is a curvature radius of an object side surface of the sixth lens at an optical axis.

7. The optical imaging system according to claim 1, wherein the optical imaging system satisfies the following condition:

$$20.0 < |R41/ET4| < 71.5;$$

wherein R41 is a curvature radius of an object side surface of the fourth lens at an optical axis, and ET4 is a thickness of an edge of an optical effective region of the fourth lens.

8. The optical imaging system according to claim 1, wherein the optical imaging system satisfies the following condition:

$$0.35 < (CT1+CT2)/SD1 < 0.5;$$

wherein CT1 is a thickness of the first lens at an optical axis, CT2 is a thickness of the second lens at the optical axis, and SD1 is a vertical distance from an edge of an effective region of an object side surface of the first lens to the optical axis.

9. The optical imaging system according to claim 1, wherein the optical imaging system satisfies the following condition:

$$1.2 \leq (CT3+CT4+CT5)/BF < 2.4;$$

wherein CT3 is a thickness of the third lens at an optical axis, CT4 is a thickness of the fourth lens at the optical axis, CT5 is a thickness of the fifth lens at the optical axis, and BF is a minimum distance between an image side surface of the sixth lens and an image plane in a direction parallel to the optical axis.

10. The optical imaging system according to claim 1, wherein the optical imaging system satisfies the following condition:

$$0.85 < TTL/(ImgH*2) < 1.1$$

wherein TTL is a distance from an object side surface of the first lens to an imaging plane at an optical axis, and ImgH is half of a diagonal length of an effective imaging region of the optical imaging system on the imaging plane.

11. An image capturing module, comprising:
the optical imaging system of claim 1, and
a photosensitive element, disposed on an image side of the optical imaging system.

12. An electronic device, comprising:
a housing; and
the image capturing module of claim 11, wherein the image capturing module is mounted on the housing.

13. An optical imaging system, comprising, sequentially from an object side to an image side:
a first lens having negative refractive power;
a second lens having refractive power;
a third lens having positive refractive power;
a fourth lens having refractive power;
a fifth lens having negative refractive power; and
a sixth lens having positive refractive power;
the optical imaging system satisfies the following condition:

$$87.0°/mm < FOV/f \leq 128.0°/mm;$$

wherein FOV is a maximum field of view of the optical imaging system, and f is an effective focal length of the optical imaging system;

$$0.35 < (CT1+CT2)/SD1 < 0.5;$$

wherein CT1 is a thickness of the first lens at an optical axis, CT2 is a thickness of the second lens at the optical axis, and SD1 is a vertical distance from an edge of an effective region of an object side surface of the first lens to the optical axis.

14. An optical imaging system, comprising, sequentially from an object side to an image side:
- a first lens having negative refractive power;
- a second lens having refractive power;
- a third lens having positive refractive power;
- a fourth lens having refractive power;
- a fifth lens having negative refractive power; and
- a sixth lens having positive refractive power;
- the optical imaging system satisfies the following condition:

$$87.0°/mm < FOV/f \leq 128.0°/mm;$$

wherein FOV is a maximum field of view of the optical imaging system, and f is an effective focal length of the optical imaging system;

$$0.85 < TTL/(ImgH*2) < 1.03;$$

wherein TTL is a distance from an object side surface of the first lens to an imaging plane at an optical axis, and ImgH is half of a diagonal length of an effective imaging region of the optical imaging system on the imaging plane.

\* \* \* \* \*